United States Patent [19]
Davies et al.

[11] Patent Number: 6,011,089
[45] Date of Patent: *Jan. 4, 2000

[54] SPRAY DRYING OF POLYMER-CONTAINING DISPERSIONS, WATER-IN-OIL EMULSIONS AND WATER-IN-OIL MICROEMULSIONS, AND DRY POLYMER PRODUCTS FORMED THEREBY

[75] Inventors: William Bloor Davies, Darien; John Edward Healy, Fairfield, both of Conn.; Gary Kaui Lani Miller, Port Chester, N.Y.; Joseph J. Kozakiewicz, Trumbull; Roderick G. Ryles, Milford, both of Conn.

[73] Assignee: Cytec Technology Corp., Wilmington, Del.

[ * ] Notice: This patent issued on a continued prosecution application filed under 37 CFR 1.53(d), and is subject to the twenty year patent term provisions of 35 U.S.C. 154(a)(2).

[21] Appl. No.: 08/670,194

[22] Filed: Jun. 21, 1996

Related U.S. Application Data

[63] Continuation-in-part of application No. 08/479,057, Jun. 7, 1995.

[51] Int. Cl.[7] ............................... C08J 3/03; C08K 7/22; C08F 20/56; B03D 3/06
[52] U.S. Cl. ........................ 523/335; 523/223; 523/340; 523/342; 523/815; 523/816; 523/904; 523/934; 524/815; 524/816; 524/904; 525/934; 526/287; 526/310; 526/318.4; 526/318.42; 528/501; 209/5
[58] Field of Search ............................ 526/310, 318.4, 526/930, 318.42, 287; 523/223, 340, 335, 342; 524/815, 816, 904; 528/501; 525/934; 209/5

[56] References Cited

U.S. PATENT DOCUMENTS

| | | | |
|---|---|---|---|
| H915 | 5/1991 | Gibbs | 521/25 |
| 3,275,449 | 9/1966 | Fritzberg | 99/80 |
| 3,279,924 | 10/1966 | Peebles | 99/56 |
| 3,325,425 | 6/1967 | Bray, Jr. | 523/342 |
| 3,803,111 | 4/1974 | Munro et al. | 260/89.5 S |
| 4,035,317 | 7/1977 | Gershberg | 260/2.5 N |
| 4,112,215 | 9/1978 | Boessler et al. | 528/503 |
| 4,121,784 | 7/1980 | Phillips et al. | 260/29.6 WQ |
| 4,171,296 | 10/1979 | Connelly et al. | 260/29.6 WQ |
| 4,212,784 | 7/1980 | Phillips et al. | 260/29.6 |
| 4,506,062 | 3/1985 | Flesher et al. | 526/211 |
| 4,528,321 | 7/1985 | Allen et al. | 524/761 |
| 4,585,809 | 4/1986 | Auer et al. | 523/139 |
| 4,614,827 | 9/1986 | Arndt et al. | 556/131 |
| 4,628,078 | 12/1986 | Glover et al. | 526/303.1 |
| 4,696,762 | 9/1987 | Sander et al. | 252/311 |
| 4,707,290 | 11/1987 | Seiter et al. | 252/140 |
| 4,747,880 | 5/1988 | Berrido et al. | 524/55 |
| 4,767,540 | 8/1988 | Spitzer et al. | 210/728 |
| 4,798,888 | 1/1989 | Symes et al. | 536/123 |
| 4,816,558 | 3/1989 | Rauch et al. | 528/501 |
| 4,835,206 | 5/1989 | Farrar et al. | 524/457 |
| 4,847,309 | 7/1989 | Klesse et al. | 523/139 |
| 4,892,910 | 1/1990 | Klesse et al. | |
| 4,892,932 | 1/1990 | Rauch et al. | 528/499 |
| 4,946,654 | 8/1990 | Uhlemann et al. | 422/140 |
| 4,954,562 | 9/1990 | Anderson | 524/779 |
| 4,956,399 | 9/1990 | Kozakiewicz et al. | 523/223 |
| 4,956,400 | 9/1990 | Kozakiewicz et al. | 523/223 |
| 5,025,004 | 6/1991 | Wu et al. | 514/165 |
| 5,037,881 | 8/1991 | Kozakiewicz et al. | 524/812 |
| 5,132,023 | 7/1992 | Kozakiewicz et al. | 210/734 |
| 5,167,766 | 12/1992 | Honig et al. | 162/164.1 |
| 5,171,781 | 12/1992 | Farrar et al. | 524/547 |
| 5,213,693 | 5/1993 | McGrow et al. | 210/728 |
| 5,274,055 | 12/1993 | Honig et al. | 524/47 |
| 5,286,806 | 2/1994 | Neff et al. | 525/369 |
| 5,346,986 | 9/1994 | Schneider et al. | 528/501 |

(List continued on next page.)

FOREIGN PATENT DOCUMENTS

| | | |
|---|---|---|
| 0 084 837 | 8/1983 | European Pat. Off. . |
| 0180 366A2 | 10/1985 | European Pat. Off. . |
| 0252 897 A2 | 1/1988 | European Pat. Off. . |
| 0277018 | 8/1988 | European Pat. Off. . |
| 0 479 616 A1 | 8/1992 | European Pat. Off. . |
| 0711586 A2 | 11/1995 | European Pat. Off. . |
| 124979 | 3/1974 | Japan ............... C08F 20/56 |
| 64-16812 | 1/1989 | Japan . |
| 04 145 131 | 5/1994 | Japan . |
| WO 95/25129 | 9/1995 | WIPO . |

OTHER PUBLICATIONS

Wolfgang Pietsch, Compactconsult, Inc., Chemical Engineering Progress, "Successfully Use Agglomeration for Size Enlargement," Apr. 1996 pp. 29–45.

Peter Koenig, Hosokawa Bepex Corp., Powder and Bulk Engineering, "Speeding up continuous mixing agglomeration with fast agitation and short residence times," Feb. 1996 pp. 67–72, 74, 76, 78–80, 82,84.

Ullmann's Encyclopedia of Industrial Chemistry, Fifth, Completely Revised Edition, vol. B3: Unit Operations II, Editors Barbara Elvers, Michael Ravenscroft, James F. Rounsaville, Gail Schultz, VCH, "Heat Exchange," pp. 2–18–2–19.

*Primary Examiner*—Tae Yoon
*Attorney, Agent, or Firm*—Joseph J. Mallon; Claire M. Schultz

[57] ABSTRACT

Processes for spray drying water-soluble and water-swellable vinyl-addition polymer-containing dispersions, emulsions and microemulsions to obtain substantially dry water-soluble or water-swellable polymer particles, compositions of substantially dry water-soluble or water-swellable polymer particles, methods of agglomerating spray-dried polymer particles, and methods of using spray-dried polymer particles and agglomerates in water-treating, mining, paper, food processing, soil conditioning, solution thickening, biotechnological, and oil recovery applications are disclosed.

24 Claims, No Drawings

U.S. PATENT DOCUMENTS

| | | | |
|---|---|---|---|
| 5,596,056 | 1/1997 | Nambu et al. | 526/207 |
| 5,604,272 | 2/1997 | Penzel et al. | 524/3 |
| 5,621,055 | 4/1997 | Miyanaga et al. | 526/225 |
| 5,652,283 | 7/1997 | Boeckh et al. | 524/47 |
| 5,684,107 | 11/1997 | Schneider et al. | 526/303.1 |
| 5,696,228 | 12/1997 | Coville | 528/502 |
| 5,698,007 | 12/1997 | Schmitt | 75/772 |
| 5,744,152 | 4/1998 | Langley et al. | 424/408 |
| 5,795,926 | 8/1998 | Niessner et al. | 523/339 |

SPRAY DRYING OF POLYMER-CONTAINING DISPERSIONS, WATER-IN-OIL EMULSIONS AND WATER-IN-OIL MICROEMULSIONS, AND DRY POLYMER PRODUCTS FORMED THEREBY

This application is a continuation-in-part of application Ser. No. 08/479,057, filed Jun. 7, 1995.

FIELD OF THE INVENTION

This invention relates generally to processes for spray drying dispersions, emulsions and microemulsions containing water-soluble or water-swellable polymers to obtain substantially dry water-soluble or water-swellable polymer particles, compositions of substantially dry water-soluble or water-swellable polymer particles, and methods of using said polymer particles in water-treating, mining, paper, biotechnological, food processing, soil conditioning, solution thickening, and oil recovery applications.

BACKGROUND OF THE INVENTION

High molecular weight, water-soluble and water-swellable polymers produced from such monomers as acrylamide are commercially important materials. These polymers find use as flocculants for mining operations to recover ore from slurries, water treating to remove suspended impurities etc., in agriculture as soil conditioners, and also in paper making to aid paper formation and in oil recovery industries.

Water-soluble and water-swellable polymers are generally commercially available in solution, dry, dispersion, water-in-oil emulsion, and water-in-oil microemulsion forms. In many cases polymer solutions are convenient, but may be limited to low molecular weight polymers and/or low solids levels because of the problem of handling viscous solutions of high solids, high molecular weight polymers. At very high solids and/or molecular weights, the solutions form gels that can be comminuted to form fine polymer gel particles that may be dissolved into water by the end-user. Although these comminuted gels typically contain up to about 20% water, they are frequently called "dry" polymers to distinguish them from the other product forms. In many cases the dry polymers exhibit long dissolution times and poor handling characteristics e.g. dusting. Although some handling problems may be mitigated by agglomeration see e.g. EP 0 277 018 A2; U.S. Pat. Nos. 3,279,924; 3,275,449, 4,696,762; 5,171,781; both solutions and gels of water-soluble and water-swellable polymers may also suffer from the lack of a convenient method for post-reacting or functionalizing the polymer.

Another problem relates to blends of dry polymers, particularly when blending dry polymers having different particle sizes or particle size distributions. It is well known that dry polymer particles tend to stratify on handling and storage, with the larger particles tending to settle towards the bottom of the container, and the smaller particles tending to be concentrated towards the top. Stratification may be inconvenient because differences in handling characteristics are encountered as a function of container depth. The stratification problem may be exacerbated when two different dry polymers are blended together, because the particle size distributions of the two products are generally not identical. Stratification on storage may affect blend product performance as the top of the container tends to become enriched in the polymer having the smaller particle size. For obvious reasons, changes in product performance as a function of storage depth are to be avoided, and it is generally preferred that each polymer be of similar particle size, see e.g. EP 479 616 A1 and U.S. Pat. No. 5,213,693. However, when producing dry polymer by spray-drying, changes in production e.g. changes in dryer size, dryer temperature, bulk viscosity of the feed, atomizer type, etc. may affect particle size, and it may be difficult or impossible to achieve a desired particle size while simultaneously maintaining some other production parameter, so blends of spray-dried polymers may be adversely affected by stratification.

The advent of water-in-oil emulsion and water-in-oil microemulsion forms of water-soluble and water-swellable polymers solved some of these problems, e.g. blends of water-in-oil emulsions and water-in-oil microemulsions as disclosed in U.S. patent application Ser. Nos. 08/157,764 and 08/157,795 do not tend to stratify, and high solids, high molecular weight, and relatively fast dissolution times may all be obtained simultaneously. In addition, unique functionalized polymers may be produced that cannot be practically manufactured by polymerization in solution. For instance, U.S. Pat. Nos. 4,956,399; 4,956,400; 5,037,881; and 5,132,023, teach that functionalization of a water-soluble polymer contained in a water-in-oil microemulsion can be carried out to produce high molecular weight charged polymers with advantageous flocculation performance. The use of microemulsions, as opposed to emulsions, in polymer production provides improved polymer performance properties among other benefits. Hydrolyzed polyacrylamides with uniquely high molecular weight are disclosed in U.S. Pat. No. 5,286,806. In U.S. Pat. No. 4,767,540, very high molecular weight hydroxamate-functionalized polyacrylamide is disclosed, and novel charged organic polymer microbeads are disclosed in U.S. Pat. Nos. 5,274,055 and 5,167,766. In addition, methods for esterifying (meth) acrylic acid polymer and, optionally, hydroxamating said polymers are disclosed in U.S. patent application Ser. No. 08/626,297.

Despite the many benefits provided by emulsion and microemulsion polymers, transportation costs associated with such materials remain high and disposal of the oil and emulsifier in the emulsions may pose environmental concerns as secondary pollution. Moreover, many emulsion and microemulsion polymers tend to exhibit stability problems, e.g. detrimental changes in polymer properties and/or performance as a function of time. Although Ser. Nos. 08/157,764 and 08/157,795; and U.S. Pat. Nos. 4,956,399; 4,956,400; 5,037,881; 5,132,023; 5,274,055; and 5,167,766 mention non-solvent precipitation and stripping as methods of recovering dry polymer products from water-swellable or water-soluble polymer microemulsions or microemulsion-containing blends, these methods may produce a dry polymer with undesirable handling properties, poor dissolution times, low bulk density, etc. Practically, non-solvent precipitation and stripping may be inconvenient and expensive.

Water-soluble polymers may also be prepared in the form of suspensions or dispersions of polymer beads or droplets in a non-aqueous liquid e.g. oil. The reverse phase polymerization process described in U.S. Pat. No. 4,528,321 is said to form dispersions of water-soluble polymers. Water-soluble polymer dispersions, which may be azeotropically dried, are disclosed in U.S. Pat. No. 4,628,078. U.S. Pat. No. 4,506,062 discloses a reverse phase suspension polymerization process for the production of high molecular weight, water-soluble polymers and also reports that dry polymer beads may be obtained by azeotropic evaporation followed by filtration. However, a problem remains in that azeotropic distillation tends to be energy-intensive, and the filtering process may be hazardous or inconvenient.

Although dry polymers may be obtained from vinyl-addition polymer-containing water-in-oil emulsions, water-in-oil microemulsions or dispersions by such methods as precipitation in a non-solvent, stripping, etc., these methods may also be impractical for economic and environmental reasons because of difficulties in recovering, purifying and recycling the oil. Although the oil recovered from an emulsion or suspension polymerization may occasionally be recycled without further purification, as disclosed in U.S. Pat. No. 4,212,784 and JP 50-124979, in other cases e.g. S.I.R. H915 additional purification steps are necessary. The level of impurities in the oil is an important consideration, as certain polymerizations e.g. chain-growth polymerizations, or polymerizations used to make very high molecular weight polymers, are especially sensitive to even trace amounts of polymerization-debilitating substances. Particular problems are also encountered where the polymer has been formed from monomers in the presence of the oil or the oil has been heated or subjected to processing steps, which may have a tendency to deposit polymerization-debilitating impurities in the oil.

Spray-drying is the transformation of feed from a fluid state to a dried particulate form by spraying the feed into a hot drying medium, typically a hot gas. Spray-drying is widely used to produce a diverse range of products e.g. instant coffee, dried eggs, instant milk, household detergents, pharmaceutical products, pigments, cosmetics, starch, plastics, ceramics, etc. Typical spray-drying equipment, drying procedures, etc. are described in detail in known references e.g. "Spray Drying Handbook," by K. Master, 5th Ed., Longman Scientific, 1991.

Aqueous solutions of water-soluble polymers may be spray dried as in U.S. Pat. Nos. 3,803,111 and 4,892,932. U.S. Pat. Nos. 4,847,309 and 4,585,809 disclose processes for spray-drying acrylic polymer-containing emulsions, U.S. Pat. No. 4,798,888 discloses a process for spray-drying a polysaccharide emulsion, U.S. Pat. No. 4,816,558 discloses a process for spray-drying an aqueous dispersion of a synthetic resin and U.S. Pat. No. 4,112,215 discloses a process for spray-drying an aqueous dispersion of a copolymer. U.S. Pat. No. 5,025,004 discloses a process for spray-drying an emulsion of a water-insoluble polymer.

U.S. Pat. No. 4,035,317 teaches that water-in-oil emulsions of water-soluble vinyl-addition polymers may be spray dried, under certain conditions, to produce free-flowing, non-dusting polymer particles which rapidly dissolve in water. Powders of polyacrylamide, acrylamide/acrylic acid copolymer, and acrylamide/dimethylaminopropyl methacrylate copolymers are described therein. The size range of the spray-dried products is such that none are smaller than about 325 mesh (about 40 microns), at least about 50% are larger than about 120 mesh (about 122 microns), and substantially none of the particles are larger than about 20 mesh (about 841 microns). These particles do not clump when added to water and dissolve much faster than traditional dry or gel particles of water-soluble polymers. When the spray-dried particles are either larger or smaller than this size range, however, they dissolve with difficulty. Although the invention of U.S. Pat. No. 4,035,317 was a significant advance in the art, a difficulty nevertheless remains with respect to certain polymers, in that the spray-drying methods of said patent gives polymers whose properties are undesirably changed relative to the emulsion or microemulsion form. Attempts to spray-dry Mannich polyacrylamides according to the teachings in the art resulted in polymer powder exhibiting reduced flocculation performance, compared to that of the corresponding polymers used in the microemulsion form. Furthermore, the viscosities of solutions of the spray-dried products tended to be significantly lower than desired.

Accordingly, there exists a need for a method of recovering water-soluble and water-swellable polymers from dispersions, water-in-oil emulsions or water-in-oil microemulsions to produce rapidly dissolving water-soluble polymers without adversely affecting polymer properties. It would also be advantageous to provide blends of two or more spray-dried dry polymers and methods for production thereof wherein 90% or greater of the particles in the blend are each individually comprised of two or more polymers, so that the effect of stratification on the blend is minimized. There also exists a need for an economical method for producing substantially dry polymers having good handling and dissolution properties. It would also be advantageous to provide methods for spray-drying dispersions, water-in-oil emulsions and water-in-oil microemulsions which eliminate or reduce undesirable product changes, and enable component recycling or reuse.

A method has now been discovered for producing substantially dry water-soluble and water-swellable vinyl-addition polymers by spray-drying the corresponding polymer dispersion, water-in-oil emulsion, or water-in-oil microemulsion. Surprisingly, novel dry polymer products are obtained whose properties and/or performance are not detrimentally changed by the spray-drying process. Surprisingly, substantially dry polymers produced by methods of the instant invention tend to have improved stability relative to the corresponding dispersion, water-in-oil emulsion, or water-in-oil microemulsion polymers. Advantageous blends of two or more spray-dried dry polymers and methods for production thereof are also provided, wherein 90% or more of the particles in the blend are each individually comprised of two or more polymers. Surprisingly, the dissolution and handling characteristics of the spray-dried polymer particles of the instant invention are improved by agglomeration. Methods of using the instant compositions of polymer particles and agglomerates in water-treating, paper making, mining, oil, and agricultural industries are disclosed. In further embodiments of the invention, the oil phase of the water-in-oil emulsion or water-in-oil microemulsion is recovered, and purified in another embodiment, said oil phase being surprisingly substantially free of polymerization-debilitating substances.

All patents, patent applications, books, and articles mentioned herein are hereby incorporated by reference.

SUMMARY OF THE INVENTION

According to the instant invention, there is provided a process for producing substantially dry water-soluble or water-swellable vinyl-addition polymer particles comprising (a) spray-drying a vinyl-addition polymer-containing dispersion, water-in-oil emulsion or water-in-oil microemulsion into a gas stream with a residence time of about 8 to about 120 seconds and at an outlet temperature of about 70° C. to less than 100° C. and (b) collecting resultant polymer particles.

In another embodiment, there is provided a process for producing substantially dry water-soluble or water-swellable vinyl-addition polymer agglomerates comprising (a) spray-drying a vinyl-addition polymer-containing water-in-oil emulsion or water-in-oil microemulsion into a gas stream with a residence time of about 8 to about 120 seconds and at an outlet temperature of about 70° C. to about 100° C., (b) collecting resultant polymer particles, and (c) agglomerating said polymer particles to form agglomerates.

In another embodiment, there is provided a process for producing substantially dry water-soluble or water-swellable polymer particles from a blend, comprising: (a) spray-drying a blend comprised of, or made by intermixing (i) a first water-soluble or water-swellable vinyl-addition polymer-containing dispersion, water-in-oil emulsion or water-in-oil microemulsion and (ii) a second water-soluble or water-swellable vinyl-addition polymer-containing dispersion, water-in-oil emulsion or water-in-oil microemulsion, into a gas stream with a residence time of about 8 to about 120 seconds and at an outlet temperature of about 70° C. to about 150° C. and (b) collecting resultant polymer particles.

In yet another embodiment, there is provided a process for producing substantially dry water-soluble or water-swellable polymer agglomerates from a blend, comprising: (A) spray-drying a blend comprised of, or made by intermixing, (I) a first water-soluble or water-swellable vinyl-addition polymer-containing water-in-oil emulsion or water-in-oil microemulsion and (II) a second water-soluble or water-swellable vinyl-addition polymer-containing water-in-oil emulsion or water-in-oil microemulsion, into a gas stream with a residence time of about 8 to about 120 seconds and at an outlet temperature of about 70° C. to about 150° C., (B) collecting resultant polymer particles, and (C) agglomerating resultant polymer particles.

In another embodiment, there is provided a process for producing substantially dry water-soluble or water-swellable polymer agglomerates comprising (a) spray-drying a vinyl-addition polymer-containing dispersion, water-in-oil emulsion, or water-in-oil microemulsion (b) collecting resultant polymer particles; and (c) agglomerating said resultant polymer particles.

In yet another embodiment, there is provided a process for recovering oil from a water-soluble vinyl-addition polymer-containing dispersion, water-in-oil emulsion, or water-in-oil microemulsion spray-drying process, comprising (a) condensing spray-dry process-generated oil and water to obtain condensed oil and condensed water; and (b) separating said condensed oil from said condensed water, wherein said condensed oil is substantially free of non-gaseous polymerization-debilitating substances.

In still another embodiment, there is provided a process for purifying spray-dry process-generated oil, comprising (a) spray-drying a water-soluble vinyl-addition polymer-containing dispersion, water-in-oil emulsion, or water-in-oil microemulsion; (b) recovering spray-dry process-generated oil to obtain recovered oil; (c) intermixing said recovered oil with aqueous liquid to obtain purified oil; and (d) separating purified oil substantially free of non-gaseous polymerization-debilitating substances.

In a further embodiment, there is provided a process for purifying spray-dry process-generated oil, comprising (a) spray-drying a water-soluble vinyl-addition polymer-containing-containing water-in-oil emulsion or microemulsion into a gas stream with a residence time of about 8 to about 120 seconds and at an outlet temperature of about 70° C. to about 120° C. or at an outlet temperature of about 70° C. to about 95° C.; (b) collecting resultant polymer particles; (c) recovering spray-dry process-generated oil to obtain recovered oil; (d) intermixing said recovered oil with aqueous liquid to obtain purified oil; and (e) separating purified oil substantially free of non-gaseous polymerization-debilitating substances.

In a still further embodiment, there is provided substantially dry water-soluble or water-swellable polymer particles comprised of a functionalized polymer, or a polymer having pendant groups selected from the group consisting of amide, tertiary aminomethyl, quaternized tertiary aminomethyl, hydroxyl, glyoxal, sulfonate, sulfonate salt, carboxylic acid, carboxylic acid salt, hydroxamic acid, hydroxamic acid salt, dialkylamiioalkyl(alk)acrylate, dialkylaminoalkyl(alk)acrylate salts, and quaternized dialkylaminoalkyl(alk)acrylate, said particles having a bulk density of about 0.4 grams per cubic centimeter to about 1.0 grams per cubic centimeter, as well as substantially dry water-soluble or water-swellable polymer agglomerates resulting from the agglomeration of these particles, and a method of treating suspended solids, comprising (a) dissolving, dispersing or intermixing substantially dry water-soluble or water-swellable polymer agglomerates with or in water to form a polymer solution, polymer dispersion, or aqueous mixture, (b) intermixing said polymer solution, dispersion or aqueous mixture with suspended solids, and (c) separating resultant concentrated solids from resultant aqueous liquid.

Finally, there are provided substantially dry water-soluble or water-swellable polymer particles made by a process comprising (a) spray-drying a vinyl-addition polymer-containing dispersion, water-in-oil emulsion, or water-in-oil microemulsion into a gas stream with a particular residence time, preferably in the range of about 8 to about 120 seconds, and at a particular outlet temperature in the range of about 70° C. to less than 100° C. and (b) collecting resultant polymer particles, said polymer particles having a drying loss less than: (i) the drying loss of substantially dry water-soluble or water-swellable polymer particles made by a process comprising (a) spray-drying said vinyl-addition polymer-containing dispersion, water-in-oil emulsion, or water-in-oil microemulsion into a gas stream with a residence time of greater than about 120 seconds and at said particular outlet temperature and (b) collecting resultant polymer particles; or (ii) the drying loss of substantially dry water-soluble or water-swellable polymer particles made by a process comprising (a) spray-drying said vinyl-addition polymer-containing dispersion, water-in-oil emulsion, or water-in-oil microemulsion into a gas stream with said particular residence time and at an outlet temperature of greater than about 100° C. and (b) collecting resultant polymer particles; or (iii) the drying loss of substantially dry water-soluble or water-swellable polymer particles made by a process comprising (a) spray-drying said vinyl-addition polymer-containing dispersion, water-in-oil emulsion, or water-in-oil microemulsion into a gas stream with a residence time of greater than about 120 seconds and at an outlet temperature of greater than about 100° C. and (b) collecting resultant polymer particles, as well as substantially dry water-soluble or water-swellable polymer agglomerates resulting from the agglomeration of these particles, and a method of treating suspended solids, comprising (a) dissolving, dispersing or intermixing substantially dry water-soluble or water-swellable polymer agglomerates with or in water to form a polymer solution, polymer dispersion, or aqueous mixture, (b) intermixing said polymer solution, dispersion or aqueous mixture with suspended solids, and (c) separating resultant concentrated solids from resultant aqueous liquid

DETAILED DESCRIPTION OF THE PREFERRED EMBODIMENTS

In accordance with the instant invention, vinyl-addition polymer-containing dispersions, water-in-oil emulsions, and water-in-oil microemulsions are sprayed-dried by a suitable means into a large chamber through which a hot gas is blown, thereby removing most or all of the volatiles and enabling the recovery of the dried polymer. Surprisingly, the means for spraying the dispersion, water-in-oil emulsion, or water-in-oil microemulsion into the gas stream are not particularly critical and are not limited to pressure nozzles having specified orifice sizes; in fact, any known spray-drying apparatus may be used. For instance, means that are well known in the art such rotary atomizers, pressure nozzles, pneumatic nozzles, sonic nozzles, etc. can all be used to spray-dry the dispersion, water-in-oil emulsion, or water-in-oil microemulsion into the gas stream. The feed rate, feed viscosity, desired particle size of the spray-dried product, droplet size of the dispersion, water-in-oil emulsion, or water-in-oil microemulsion, etc. are factors which are typically considered when selecting the spraying means. The size and shape of the chamber, the number and type of spraying means, and other typical operational parameters may be selected to accommodate dryer conditions using common knowledge of those skilled in the art.

Although open cycle spray-dryers may be used, closed cycle spray-drying systems are preferred. Gas flow may be cocurrent, countercurrent or mixed flow, cocurrent flow being preferred. The hot gas, or inlet gas, may be any gas that does not react or form explosive mixtures with the feed and/or spray-dried polymer. Suitable gases used as the inlet gas are gases known to those skilled in the art, including air, nitrogen, and other gases which will not cause undesirable polymer degradation or contamination, preferably gases containing about 20% or less oxygen, more preferably about 15% or less oxygen. Most preferably, inert gases such as nitrogen, helium, etc. that contain about 5% or less of oxygen should be used.

The dried polymer may be collected by various means such as a simple outlet, classifying cone, bag filter, etc., or the polymer may be subjected to further stages of drying, such as by fluid beds, or agglomeration. The means for collecting the dry polymer product is not critical. The hot gas that remains after substantially all of the polymer is removed from the feed generally contains volatiles such as oil, water, etc. and may be vented to the atmosphere or recovered, preferably recovered and most preferably thereafter, recycled. The oil is generally recovered from a vinyl-addition polymer-containing dispersion, water-in-oil emulsion, and water-in-oil microemulsion spray-drying process by condensing spray-dry process-generated oil, preferably cocondensing spray-dry process-generated oil and spray-dry process-generated water, and separating condensed or recovered oil from condensed water. Said separating is easily accomplished by simply draining off the lower layer, and/or pumping off the upper layer, as water and oil are essentially immiscible. The difference in boiling points between water and oil may be such that the condenser may be operated at a temperature so as to only condense the oil, reducing the energy costs associated with condensing the vaporized water. However, it has been surprisingly discovered that cocondensation of both the water and oil may be beneficial, as the recovered or cocondensed oil is generally substantially free of non-gaseous polymerization-debilitating substances. The volatiles are preferably condensed or cocondensed with a spray condenser. Spray condensers are well-known to those skilled in the art and function by spraying a liquid into hot gas, causing the hot gas to cool and causing the volatile oil, water, etc. contained in the hot gas to condense. The spray condenser may utilize an aqueous liquid, preferably water, more preferably aqueous acid, most preferably aqueous inorganic acid e.g. aqueous sulfuric acid. Polymerization-debilitating substances are those that inhibit or retard polymerization, or act as chain-transfer agents. Polymerization-debilitating chain-transfer agents may have chain transfer constants of about $10^{-4}$ or greater. Preferably, the condensed, cocondensed, or recovered oil contains less than about 0.1% of such polymerization-debilitating substances, more preferably less than about 0.05%, by weight based on total weight.

In some cases, recovered oil, which may be cocondensed or condensed oil, may not be as free of impurities or polymerization-debilitating substances as desired. Recovered oil may be purified by intermixing said recovered oil with aqueous liquid to obtain purified oil and separating said purified oil from the resultant aqueous liquid. Oil purified in this manner is typically substantially free of non-gaseous polymerization-debilitating substances, and is generally suitable for use in subsequent polymerizations. Said aqueous liquid is preferably water, more preferably aqueous acid. Said acid is preferably an inorganic acid, more preferably sulfuric acid. In a preferred embodiment, a vinyl-addition polymer-containing water-in-oil emulsion or water-in-oil microemulsion is comprised of an oil recovered from a polymer-containing water-in-oil emulsion or water-in-oil microemulsion spray-drying process. Both purified oil and recovered oil may be treated to remove gaseous polymerization-debilitating substances such as ammonia, oxygen, methylchloride, dimethylamine, formaldehyde, etc. by known means such as by sparging with an inert gas e.g. nitrogen, helium, etc.

On way to determine whether a treated, recovered, or purified oil is substantially free of non-gaseous polymerization-debilitating substances is to use a particular oil to prepare a vinyl-addition polymer-containing dispersion, water-in-oil emulsion, or water-in-oil microemulsion which is subsequently spray-dried, and then to recover the condensed or cocondensed oil and, optionally, to purify the recovered oil. If the resultant recovered or purified oil is substantially free of non-gaseous polymerization-debilitating substances, the molecular weight or solution viscosity of polyacrylamide prepared by polymerizing or copolymerizing acrylamide in a water-in-oil emulsion or water-in-oil microemulsion using said particular oil will generally be substantially the same as the molecular weight or solution viscosity of polyacrylamide prepared by polymerizing acrylamide in a dispersion, water-in-oil emulsion or water-in-oil microemulsion using said recovered or purified oil, under otherwise substantially identical conditions.

In one embodiment of the instant invention, the level of formaldehyde in the recovered or purified oil obtained by spray-drying a dispersion, water-in-oil emulsion, or water-in-oil microemulsion, preferably a quaternized Mannich poly(alk)acrylamide microemulsion, is typically less than one hundred milligrams formaldehyde per kilogram of recovered or purified oil, preferably less than ten milligrams formaldehyde per kilogram of recovered or purified oil, and most preferably less than one milligram formaldehyde per kilogram of recovered or purified oil. Formaldehyde may be detrimental to certain types of polymerization processes, so that a very much reduced level of formaldehyde in the recovered or purified oil is a substantial advantage. It is economically and environmentally advantageous to recycle the oil for use in other processes, including the same or other polymerization processes. The lack of oil and certain residual chemical reagents from the post-reaction step, in particular formaldehyde, in the polymer particles are also substantial environmental advantages.

There are four interrelated operating parameters in the instant spray-drying process: gas inlet temperature, gas outlet temperature, product volatiles and residence time in the dryer. The outlet temperature generally should be about 150° C. or below, preferably about 120° C. or below, more preferably less than 100° C., even more preferably about 95° C. or below, most preferably about 90° C. or below. The outlet temperature is generally about 70° C. or higher, preferably about 75° C. or higher. Therefore, outlet temperatures are generally about 70° C. to about 150° C., preferably about 70° C. to about 120° C., more preferably about 70° C. to less than 100°, even more preferably about 70° C. to about 95° C., most preferably about 75° C. to about 90° C. Outlet temperatures below about 70° C. may be suitable in certain instances, though generally this is less preferred. For instance, at the cost of efficiency, spray drying could be carried out at long residence times, high gas flow rates and low outlet temperatures.

Generally, the dryer should be operated at the lowest possible outlet temperature consistent with obtaining a satisfactory product. To facilitate operating at the lowest possible operating temperature, the vinyl-addition polymer-containing dispersion, water-in-oil emulsion or water-in-oil microemulsion is preferably comprised of a volatile oil. "Volatile", for purposes of this invention, means that the boiling point or upper end of the boiling point range of the oil is about 200° C. or below, preferably about 190° C. or below, most preferably about 180° C. or below. Although the use of an oil having a boiling point or upper end of the boiling point range of greater than 200° C. may be acceptable in some cases, the use of a volatile oil allows for spray drying of the vinyl-addition polymer-containing dispersion, water-in-oil emulsion or water-in-oil microemulsion to be carried out at low outlet temperatures so that polymer degradation is avoided or substantially reduced. Although in theory an oil with a very low boiling point, say room temperature or below, would be most preferable to avoid product degradation, in practice oils with low boiling points in this range may, under some circumstances, be unacceptable for other reasons related to handling and flammability. Thus, oils having a boiling point within the range from about 70° C. to 190° C., preferably from about 130° C. to about 185° C., most preferably from about 160° C. to about 180° C. are used. Suitable oils useful herein include any organic hydrocarbon liquids such as halogenated hydrocarbons, aliphatic hydrocarbons, aromatic hydrocarbons, mixtures of aromatic and aliphatic hydrocarbons, etc. usually containing about 6 to about 12 carbon atoms. Preferred examples of suitable hydrocarbons include perchloroethylene, benzene, xylene, toluene, mineral oil fractions, kerosenes, naphthas, petroleum fractions and the like. A most preferred oil is a material called Isopar G manufactured by Exxon Chemical. Isopar G is a mixture of synthetic isoparaffinic hydrocarbons having a boiling point range of about 160° C. to about 177° C.

The inlet temperature, the feed rate, and the composition of the polymer emulsion may all affect outlet temperatures. These parameters may be varied to provide a desired outlet temperature. Feed rates are not critical, and generally will vary depending on the size of the dryer and the gas flow rate. Inlet gas temperature is less critical than outlet gas temperature, and is generally about 140° C. or above, preferably about 160° C. or above. The inlet gas temperature is preferably about 200° C. or below and more preferably about 180° C. or below. Thus, preferred inlet gas temperature ranges from about 140° C. to about 200° C., more preferably from about 160° C. to about 180° C. Proper inlet gas temperatures tend to avoid product degradation on the high side and to avoid inadequate drying on the low side.

Residence time is a nominal value obtained by dividing the volume of the dryer by the volumetric gas flow. Residence time is generally at least about 8 seconds, preferably at least about 10 seconds. Residence time is generally no more than about 120 seconds, preferably no more than about 90 seconds, more preferably no more than about 60 seconds, and most preferably no more than about 30 seconds.

Therefore, the general range of residence time is about 8 to about 120 seconds, preferably about 10 to about 90 seconds, more preferably about 10 to about 60 seconds, and most preferably about 10 to about 30 seconds. It is known to those skilled in the art that longer residence times are to be expected when larger dryers are used or when the dryer is run in a less efficient manner. For instance, at the cost of efficiency, longer residence times would be expected at very low inlet temperatures and slow gas flow rates. As a practical matter, the residence times useful in the present invention may vary from the values described above, depending on the size and type of spray dryer used, the efficiency at which it is operated, and other operational parameters. Thus, residence times specified herein may be modified to accommodate dryer conditions using common knowledge of those skilled in the art.

Any water-soluble or water-swellable vinyl-addition polymer-containing dispersion, water-in-oil emulsion or water-in-oil microemulsion may be spray-dried by the processes of the instant invention. For purposes of this invention, water-swellable polymers are generally those that have been crosslinked to a certain degree, preferably by forming the polymer in the presence of certain amounts of crosslinking or branching agents. Preferably, water-swellable polymers include microbeads of U.S. Pat. Nos. 5,274,055 and 5,167,766. Water-soluble, branched polymers generally result when smaller amounts of crosslinking agent are used to formulate the polymer, as in U.S. patent application Ser. Nos. 08/455,419 and 08/462,922. Most preferably, the water-soluble or water-swellable vinyl-addition polymer-containing dispersion, water-in-oil emulsion or water-in-oil microemulsion is as described in U.S. Pat. Nos. 4,956,399; 4,956,400; 5,037,881; 5,132,023; 5,286,806; 4,767,540; 5,274,055; 5,167,766; U.S. patent application Ser. Nos. 08/626,297; 08/455,419; and 08/462,922, which are all incorporated herein by reference. The vinyl-addition polymer content of the dispersion, water-in-oil emulsion or water-in-oil microemulsion is generally about 10% or greater, preferably greater than 15%, more preferably about 17% or greater, and most preferably 20% or greater, by weight based on total weight.

Preferably, vinyl-addition polymer-containing dispersions, water-in-oil emulsions or water-in-oil microemulsions are comprised of a polymer having pendant groups selected from the group consisting of amide, tertiary aminomethyl, quaternized tertiary aminomethyl, hydroxyl, glyoxal, sulfonate, sulfonate salt, carboxylic acid, carboxylic acid salt, hydroxamic acid, hydroxamic acid salt, dialkylaminoalkyl(alk)acrylate, dialkylaminoalkyl(alk) acrylate salts, and quaternized dialkylaminoalkyl(alk) acrylate. Thus the polymer may be Mannich poly(alk) acrylamide, quaternized Mannich poly(alk)acrylamide, hydroxamated polyacrylamide, esterified (meth)acrylic acid polymer, esterified (meth)acrylic acid copolymer, and hydrolyzed polyacrylamide. Hydrolyzed polyacrylamide may be formed by inadvertent hydrolysis during production, but is preferably post-reacted e.g. deliberately reacted with acid or base to a degree of hydrolysis of 5 mole % or more, preferably 10 mole % or more, based on total moles of recurring units, most preferably as disclosed in U.S. Pat. No. 5,286,806. The polymer may contain recurring units selected from the group consisting of acrylamide, dialkylaminoalkyl(alk)acrylate, dialkylaminoalkyl(alk) acrylate salts, quaternized dialkylaminoalkyl(alk)acrylate, (meth)acrylic acid, and salts of (meth)acrylic acid. Preferred polymers included (1) a polymer containing 10 mole % or more of recurring units having pendant groups selected from the group consisting of carboxylic acid and carboxylic acid salt and having a standard viscosity of at least about 8.0 cps, (2) a polymer containing 20 mole % or more of recurring units having pendant groups selected from the group consisting of carboxylic acid and carboxylic acid salt and having a standard viscosity of at least about 9.0 cps, (3) a polymer containing at least about 1 mole % of tertiary aminomethyl groups, (4) an acrylamide polymer containing at least about 1 mole % of quaternized tertiary aminomethyl groups, (5) an acrylamide polymer containing at least about 1 mole % of hydroxamic acid or hydroxamic acid salt groups, (6) an esterified polymer containing hydroxamic acid groups and carboxylic acid groups or salts thereof, and (7) an ionic, organic, polymer microbead being less than about 750 nanometers in diameter if crosslinked and less than about 60 nanometers in diameter if non-crosslinked and water-insoluble, the ionicity of the microbead being at least about 1%, preferably having 1 mole % or more of recurring units having pendant groups selected from the group consisting of carboxylic acid and carboxylic acid salt. Polymers and copolymers of acrylamide are particularly preferred.

In a preferred embodiment, the vinyl-addition polymer-containing water-in-oil emulsion or microemulsion is a Mannich poly(alk)acrylamide- or quaternized Mannich poly(alk)acrylamide-containing water-in-oil emulsion or microemulsion. Mannich polyacrylamide and quaternary Mannich polyacrylamide water-in-oil microemulsions may be heat treated prior to spray drying according to methods described in U.S. patent application Ser. No. 08/018,858 filed Feb. 12, 1993, which is hereby incorporated herein by reference.

The instant invention is of particular value for preparing substantially dry, functionalized or post-reacted polymers. In many cases functionalized polymers are those that may be or have been post-reacted, e.g. a chemical reaction has been performed on the polymer after the formation of the polymer from the corresponding monomers, see e.g. U.S. Pat. No. 4,956,400. The chemical reaction is generally deliberate or purposeful, and polymers which are inadvertently or indifferently reacted e.g. slightly hydrolyzed during the course of production are not generally considered to be functionalized. For example, Mannich poly(alk)acrylamides, quaternized Mannich poly(alk)acrylamides, acid- or base-hydrolyzed polyacrylamides, hydroxamated poly(alk)acrylamides, etc. are functionalized polymers that are difficult or impossible to prepare in solution or gel form. Since the usual means of preparing dry polymers is via a gel or solution polymerization as described above, dispersion, water-in-oil emulsion and water-in-oil microemulsion may be the only practical method for the preparation of functionalized or postreacted polymers.

The water-soluble or water-swellable vinyl-addition polymer-containing dispersions, water-in-oil emulsions or water-in-oil microemulsions of the instant invention are generally prepared by polymerization of the corresponding monomers, preferably as described in U.S. Pat. Nos. 4,956, 399; 4,956,400; 5,037,881; 5,132,023; 5,286,806; 4,767,540; 5,274,055; 5,167,766; and U.S. patent application Ser. Nos. 08/626,297; 08/455,419; and 08/462,922. The monomers may be polymerized in a dispersion, water-in-oil emulsion or water-in-oil microemulsion; water-in-oil emulsion or water-in-oil microemulsion are preferred. All dispersions, emulsions and microemulsions described herein are inverse or water-in-oil. An emulsion, for purposes of this invention, is generally defined as a composition comprising two liquids or phases which are insoluble in each other along with a surfactant, surfactant mixture or emulsifier. A microemulsion, for purposes of this invention, is generally defined as a thermodynamically stable composition comprising two liquids or phases which are insoluble in each other along with a surfactant, surfactant mixture or emulsifier. Polymeric inverse microemulsions which contain a continuous oil phase and a polymer-containing discontinuous phase (usually aqueous) are prepared from thermodynamically stable monomer microemulsions. Inverse microemulsions have a narrow droplet size distribution and are usually, but not always, optically transparent. The discontinuous polymer-containing phase of a microemulsion forms droplets or micelles, which are usually aqueous and usually have a volume average droplet diameter which is less than about 2500 Å, preferably less than about 2000 Å, and most preferably less than about 1000 Å. Some microemulsions may have a volume average droplet diameter as large as about 3000 Å.

Water-in-oil emulsions are well-known in the art, see e.g. Vanderhoff U.S. Pat. No. 3,284,393. For the purposes of this invention, dispersions are compositions comprised of polymer beads or droplets that are dispersed in a non-aqueous liquid e.g. oil, generally with reduced surfactant levels, but generally including other types of stabilizers, as described in e.g. U.S. Pat. Nos. 4,528,321; 4,628,078; and 4,506,062.

Homopolymers and copolymers of the monomers enumerated herein are fully encompassed by the instant invention. Preferred nonionic monomers are water-soluble monomers such as (meth)acrylamide, N-vinyl pyrrol idone, N,N-dialkyl(meth)acrylamide, hydroxyalky)(meth)acrylate, N-vinylformamide and the like. Small quantities e.g. about 10% or less, of other monomers having limited water solubility e.g. methyl acrylate, styrene, methyl methacrylate, acrylonitrile, vinyl acetate, etc. may also be used, provided that the resulting polymer is water-soluble or water-swellable. Generally, water-swellable polymers are crosslinked polymers, not polymers containing so many water-insoluble recurring units that they swell without dissolving in water. Acrylamide and methacrylamide are especially preferred non-ionic monomers. Although, in some instances, the polymer may contain 80% or even 100% nonionic monomer, preferably, the polymer contains about 50% or less of nonionic monomer, preferably about 40% or less, most preferably about 30% or less, by mole based on total moles of polymer repeat units. Water-swellable polymers or water-soluble, branched polymers may be produced by copolymerization with multifunctional branching agents e.g. methylenebisacrylamide.

Useful cationic monomers include salts and quaternaries of dialkylaminoalkyl(alk)acrylate and dialkylaminoalkyl (meth)acrylamide, and diallyldialkylammonium halide. Preferred quaternizing agents are methyl chloride, ethyl chloride, benzyl chloride, dimethylsulfate, and diethylsulfate. Preferred cationic monomers include the methyl chloride salt of dimethylaminoethyl(meth)acrylate, the methyl chloride salt of dimethylaminopropyl(meth)acrylamide, and diallyldimethylammonium chloride. Preferably, the polymer contains about 5% or more of cationic monomer, preferably about 10% or more, most preferably about 30% or more, by mole based on total moles of polymer repeat units.

Useful anionic monomers include (meth)acrylic acid, fumaric acid, crotonic acid, maleic acid, 2-acrylamido-2-methylpropanesulfonic acid, styrenesulfonic acid, and salts thereof. Sodium and ammonium salts are preferred. Preferred anionic monomers include sodium acrylate, potassium acrylate, ammonium acrylate, and the sodium salt of 2-acrylamido-2-methylpropanesulfonic acid. Generally, the polymers contain enough of the salt form of the acid such that the polymer is water-soluble or water-swellable, preferably greater than 50% of the acid monomers are in the salt form, more preferably 60% or greater, by weight based on total weight. Preferably, the polymer contains about 5% or more of anionic monomer, preferably about 50% or more, more preferably about 70% or more, most preferably about 75% or more, by mole based on total moles of polymer repeat units.

The polymerization may be carried out in the presence of such conventional additives as are desired. For example, the polymerization may contain chelating agents to remove polymerization inhibitors, chain transfer agents, pH adjusters, initiators and other conventional additives. Polymerization of the monomers may be carried out in any manner known to those skilled in the art. Initiation may be effected with a variety of thermal and redox free radical initiators, including peroxides, e.g. t-butyl peroxide; azo compounds, e.g. azobisisobutyronitrile; inorganic compounds, such as potassium persulfate and redox couples, such as ferrous ammonium sulfate/ammonium persulfate. A preferred initiator is sodium bromate/sulfur dioxide. Initiator addition may be effected any time prior to the actual polymerization per se. Polymerization may also be effected by photochemical irradiation processes, such as ultraviolet irradiation or by ionizing irradiation from a cobalt 60 source.

Surfactants and/or dispersing agents are generally helpful and sometimes necessary for the formation and continued stability of vinyl-addition polymer-containing dispersions, water-in-oil emulsions and water-in-oil microemulsions. Where spray-drying is contemplated, ongoing stability may not be required, and it may be advantageous to reduce or eliminate the surfactants and/or dispersing agents. Vinyl-addition polymer-containing dispersions, water-in-oil emulsions and water-in-oil microemulsions may be prepared using little or no surfactants and/or dispersing agent and spray-dried soon thereafter, preferably during the period of continued stability. Preferably, the vinyl-addition polymer-containing dispersions, water-in-oil emulsions and water-in-oil microemulsions contain about 2% or less of surfactant and/or dispersing agent, more preferably about 1% or less, by weight based on total weight. The spray-dried polymer particles made by the processes of instant invention preferably contain 6% or less of surfactant and/or dispersing agent, preferably 4% or less.

Substantially dry water-soluble or water-swellable polymer particles may be produced from a blend by (a) spray-drying a blend comprised of, or made by intermixing, (i) a first water-soluble or water-swellable vinyl-addition polymer-containing dispersion, water-in-oil emulsion or water-in-oil microemulsion and (ii) a second water-soluble or water-swellable vinyl-addition polymer-containing dispersion, water-in-oil emulsion or water-in-oil microemulsion, and (b) collecting resultant polymer particles. Preferred blends of water-in-oil emulsions and water-in-oil microemulsions are disclosed in Ser. No. 08/157,764 and Ser. No. 08/157,795.

Blending of water-in-oil emulsions and water-in-oil microemulsions may advantageously provide a product with improved performance by e.g. providing a property such as charge or molecular weight that is different from the individual emulsions or microemulsions from which the blend is derived. The different property may result from averaging of the properties of the blend components, or occasionally synergistic results may be observed. For instance, when treating substrates that are themselves blends or mixtures of various components, each of the blend components may have a specific role in product performance. Accordingly, although two identical water-in-oil emulsions and water-in-oil microemulsions could be blended, it it generally preferred to blend emulsions or microemulsions that are different from each other e.g. different performance, different charge, different viscosity, different molecular weight, different physical form, different chemical identity, different aging characteristics, different costs, etc.

Spray-drying of blends is advantageous because typically 90% or greater, preferably 95% or greater, most preferably substantially all, of the resultant spray-dried polymer particles each individually contains two or more water-soluble or water-swellable vinyl-addition polymers, so that stratification effects may be minimized. Spray-drying a blend may be particularly advantageous when the first water-soluble or water-swellable vinyl-addition polymer-containing water-in-oil emulsion or water-in-oil microemulsion has a viscosity that is different from the viscosity of the second water-soluble or water-swellable vinyl-addition polymer-containing water-in-oil emulsion or water-in-oil microemulsion. This is because viscosity generally impacts the particle size distribution of the spray dried polymer particles, so that the particle size distribution of the particles obtained from the first water-in-oil emulsion or water-in-oil microemulsion may be different from the particle size distribution of the particles obtained from the second water-in-oil emulsion or water-in-oil microemulsion. A dry blend of the two different polymers is thus likely to exhibit greater stratification than a dry blend obtained by spray-drying a blend of the first and second water-in-oil emulsions or water-in-oil microemulsions.

In another embodiment of the instant invention, the Mannich and quaternary Mannich polymer particles have, in some cases, substantially reduced residual contamination by certain chemical reagents added during the functionalization step e.g. formaldehyde, methyl chloride and amines. Typically, the residual level of methyl chloride in the polymer particles is below 500 parts per million parts (ppm), based on the total weight of the particles, and preferably below 100 ppm, same basis. Formaldehyde is typically below 2000 ppm and preferably below 1000 ppm, same basis. Individual residual amines, which may be present as their hydrochloride salts, are typically present at below 20,000 ppm and preferably below 10,000 ppm, same basis.

With respect to the various spray-dried and agglomerated polymer products described herein, the optimum standard viscosity for a particular polymer is very dependent on the application e.g. flocculation of suspended solids, paper making, oil recovery, mining, etc. For instance, for many applications, it is preferred that the standard viscosity of the polymer particles be about 1.5 centipoise or greater, more preferably about 2.0 centipoise or greater., most preferably about 2.5 centipoise or greater. However, applications other than flocculation may require polymers with standard viscosities higher or lower than those given above. One advantage of the instant invention is that the standard viscosity of the polymer particles produced according to the processes described herein is generally within about 15% of the standard viscosity of the corresponding polymer dispersion, water-in-oil emulsion or water-in-oil microemulsion. This indicates that the polymers are not substantially altered by the spray-drying process.

Generally, the polymers of the instant invention have a molecular weight of about 100,000 or greater, preferably greater than about 1,000,000; more preferably greater than about 10,000,000, most preferably greater than about 20,000,000. The optimum molecular weight or molecular weight range for a particular polymer is also very dependent on the application e.g. flocculation of suspended solids, paper making, oil recovery, mining, etc. For instance, for many flocculant applications, Mannich polyacrylamide and quaternized derivatives thereof have a molecular weight greater than about 100,000 and preferably greater than about 1,000,000. However, applications other than flocculation may require polymers with molecular weights higher or lower than those given above. The water-soluble polymers produced by the processes described herein may contain small amounts of insoluble polymer. Such small amounts of insoluble polymer do not generally affect the performance of the polymer in, for instance, the applications mentioned above. In some cases, water-swellable polymers are desired for applications such as fluid thickening, papermaking, printing ink thickeners, etc.

When produced according to the spray drying processes disclosed herein, polymer particles of the instant invention are generally about 10 microns or greater in diameter, preferably about 40 microns or greater, more preferably about 100 microns or greater, most preferably about 200 microns or greater. It is preferred that the polymer particles be non-dusting. Dusting and flow problems are typically exacerbated when the polymer particles are small, so larger polymer particles are generally desirable. However, very large particles may dissolve more slowly. Therefore, it is generally desirable for the polymer particles to be about 1200 microns or less in diameter, preferably about 800 microns or less in diameter, more preferably about 600 microns or less, most preferably about 400 microns or less. Generally, at least about 90% of the polymer particles range in size from about 10 microns to about 1200 microns, preferably at least about 95%, more preferably at least about 98%. The size of the polymer particles can be varied somewhat by altering the operational parameters e.g. spray configuration, emulsion viscosity, feed rate, etc. Particles may be substantially spherical or non-spherical; "diameter" of a non-spherical particle is the dimension along a major axis.

Although in some cases the particles are hollow, porous structures having at least one opening in their walls, it has been discovered that these features are not always necessary in order to obtain particles having desirable properties e.g. fast dissolution times. In many cases, the spray-drying parameters e.g. nozzle type, nozzle size, outlet temperature, etc. needed to produce particles that are hollow, porous structures having at least one opening in their walls are inconvenient or uneconomical, and it is advantageous to produce particles that lack some or all of these features.

The particles formed by the spray-drying processes of the instant invention may be screened to remove an oversize or undersize fraction. Oversize particles may be fragmented by e.g. grinding, whereas undersized particles are generally agglomerated. Sizes may be determined by methods known to those skilled in the art e.g. sieving, screening, light scattering, microscopy, microscopic automated image analysis, etc.

Surprisingly, the bulk densities of the spray-dried polymer particles of the instant invention are generally greater than the bulk densities of dry polymers prepared by precipitation of the corresponding dispersion, water-in-oil emulsion or water-in-oil microemulsion. Polymer particles having greater density may be advantageous because they occupy a smaller volume, resulting in e.g. lower shipping and storage costs. Whereas the densities of precipitated polymers are usually less than about 0.35 grams per cubic centimeter (g/cc), the bulk densities of the spray-dried polymer particles of the instant invention are generally about 0.35 g/cc or greater, preferably about 0.4 g/cc or greater, more preferably about 0.45 g/cc or greater, most preferably about 0.50 g/cc or greater. The bulk densities of the spray-dried polymer particles of the instant invention are generally about 1.1 g/cc or less, preferably about 1.0 g/cc or less, more preferably about 0.95 g/cc or less, most preferably about 0.90 g/cc or less. Therefore, the bulk densities of the spray-dried polymer particles of the instant invention generally range from about 0.35 to about 1.1 g/cc, preferably about 0.4 to about 1.0 g/cc, more preferably about 0.45 to about 0.95 g/cc, most preferably about 0.50 to about 0.90 g/cc.

Under the conditions of drying set forth herein, the polymer particles produced by the processes described herein are substantially dry. As used to describe the polymer produced herein, "substantially dry" generally means that the polymer contains about 12% or less volatiles, preferably about 10% or less by weight, based on the weight of the spray dried polymer. The polymer generally contains about 2% or more volatiles, preferably about 5% or more, by weight based on total weight, and most preferably contains from about 8% to about 10% volatiles by weight, same basis. The volatiles are measured by determining the weight loss on drying the polymer product at about 105° C. for about 30 minutes.

Substantially dry water-soluble or water-swellable polymer particles of the instant invention may be made by a process comprising (a) spray-drying a vinyl-addition polymer-containing containing water-in-oil dispersion, emulsion or water-in-oil microemulsion into a gas stream with a particular residence time, preferably in the range of about 8 to about 120 seconds, and at a particular outlet temperature in the range of about 70° C. to less than about 100° C. and (b) collecting resultant polymer particles. These polymer particles are encompassed within the instant invention when they have a drying loss less than: (i) the drying loss of substantially dry water-soluble or water-swellable polymer particles made by a process comprising (a) spray-drying said vinyl-addition polymer-containing dispersion, water-in-oil emulsion or water-in-oil microemulsion into a gas stream with a residence time of greater than about 120 seconds and at said particular outlet temperature and (b) collecting resultant polymer particles, or (ii) the drying loss of substantially dry water-soluble or water-swellable polymer particles made by a process comprising (a) spray-drying said vinyl-addition polymer-containing dispersion, water-in-oil emulsion or water-in-oil microemulsion into a gas stream with said particular residence time and at an outlet temperature of greater than about 100° C. and (b) collecting resultant polymer particles; or (iii) the drying loss of substantially dry water-soluble or water-swellable polymer particles made by a process comprising (a) spray-drying said vinyl-addition polymer-containing dispersion, water-in-oil emulsion or water-in-oil microemulsion into a gas stream with a residence time of greater than about 120 seconds and at an outlet temperature of greater than about 100° C. and (b) collecting resultant polymer particles. As used herein, "drying loss" is the change in polymer viscosity resulting from spray-drying, and is not to be confused with "loss on drying," or LOD, which is a measure of volatiles as described in the Examples. Drying loss may be expressed as the viscosity before spray drying minus the viscosity after spray drying, divided by the viscosity before spray drying, and expressed as a percentage by multiplying by 100.

Additional materials such as flow control agents, dust control agents, pH adjusting agents, surfactant, emulsifier, etc. and the like may be added to the emulsion or microemulsion before or during the spray drying process, or to the polymer particles after the spray drying process, or both, to enhance the production, distribution, packaging, handling, performance, etc. and the like of the polymer particles.

We have also discovered that mixing, in any order, an acid, base or buffer with the substantially dry water-soluble polymer particles that are the product of the spray drying processes described herein, may be advantageous. A buffer, for the purposes of this invention, is a substance or blend of substances that, when dissolved in water, gives a solution that resists changes in pH when small amounts of acid or base are added. Preferably, a buffer contains an acid and a base. For example, any solution of a weak acid plus a salt of that acid is a buffer solution. A base, for the purposes of this invention, is a substance or blend of substances that, when dissolved in pure water, gives a solution with a pH value greater than 7. An acid, for the purposes of this invention, is a substance or blend of substances that, when dissolved in pure water, gives a solution with a pH value less than 7. The addition of an acid, base or buffer to the polymer particles may enhance the flow properties of the dry polymer particles and adjusts the pH of the solution that the polymer particles are dissolved into so as to enhance the rate of dissolution and performance of the polymer particles in the desired application. Bases are preferred and buffers are most preferred. Acids, bases and buffers useful in the instant invention may be solid or liquid, though it is especially preferred to use an acid, base, or buffer that is substantially dry so as to avoid clumping. Substantially dry, when used to describe the acid, base, or buffer for the purposes of this invention, means that the powdered acid, base, or buffer flows freely. The acid, base, or buffer may be hydrated as long as it flows freely.

Any base known in the art may be used. Suitable powdered bases may include the alkali and alkaline earth metal salts of carbonate, bicarbonate, citrate, phosphate and acetate. Preferred bases may include sodium carbonate, sodium bicarbonate, potassium carbonate, potassium bicarbonate, sodium acetate, potassium acetate, sodium citrate, potassium citrate, sodium phosphate, potassium phosphate, etc. and the like. Sodium carbonate and sodium bicarbonate are more preferred, and sodium bicarbonate is most preferred. The mixture of the base and the polymer particles is such that the base may be incorporated into the interior of the particles, or may coat the surface of the particles, or may be distinct from the particles, or any combination thereof.

Any buffer known in the art may be used. Suitable buffers may comprise the alkali and alkaline earth metal salts of carbonate, bicarbonate, citrate, phosphate and acetate, with the corresponding acid. The mixture of the buffer and the polymer particles is such that the base may be incorporated into the interior of the particles, or may coat the surface of the particles, or may be distinct from the particles, or any combination thereof. The buffer system $KH_2PO_4/Na_2HPO_4$ or hydrates thereof is most preferred.

Any acid known in the art may be used. Suitable acids may comprise inorganic acids e.g. hydrochloric acid, nitrous acid, nitric acid, carbonic acid, phosphoric acid, phosphorus acid, sulfurous acid, and sulfuric acid, as well as organic acids e.g. acetic acid, lactic acid, citric acid, formic acid, alkylsulfonic acids, etc. and the like. Acids such as $KH_2PO_4$, $NaH_2PO_4$ and hydrates thereof are preferred. In instances where a quaternary Mannich polyacrylamide microemulsion is heat treated by, for example, adjusting the pH to about 3.6 to about 4.8 adding formaldehyde scavenger, adjusting the water content to about 10–45 weight percent of polymer and heating the resultant emulsion at from about 40° C. to about 80° C. for about 3 to about 20 hours, the acid is preferably added in addition to and after the heat treating step.

It is preferred to add the acid, base or buffer directly to the polymer particles. Alternatively, and less preferably, an acid, base or buffer may be dissolved in water or oil to form a solution or slurry and added to the water-soluble or water-swellable vinyl-addition polymer-containing dispersion, water-in-oil emulsion or water-in-oil microemulsion before spray drying. The solution or slurry of the acid, base or buffer may be spray dried simultaneously or substantially simultaneously with the spray drying of the water-in-oil emulsion or water-in-oil microemulsion, or the acid, base, or buffer may be added directly to the spray dryer while simultaneously or substantially simultaneously spray drying the water-in-oil emulsion or water-in-oil microemulsion, to form polymer particles which comprise the acid, base, or buffer. In this case, the acid, base, or buffer need not be substantially dry. Another, also less preferred, way to add one or more acids, bases, or buffers to the polymer is to add part of the acid, base, or buffer before or during the spray dry process, and part of the acid, base, or buffer, or perhaps a different acid, base, or buffer, to the resulting polymer particles. The buffer may be formed when a base is added to an water-in-oil emulsion or water-in-oil microemulsion or polymer particle which already contains the corresponding acid, or the buffer may be formed when an acid is added to a water-in-oil emulsion or water-in-oil microemulsion or polymer particle that already contains the corresponding base.

The amount of acid, base or buffer to be added to the water-soluble Mannich acrylamide or quaternized Mannich acrylamide polymer particles of the present invention is preferably an amount sufficient to provide a solution pH of from about 5 to about 11, preferably from about 5.5 to about 9 and most preferably about 6 to about 8, when the particles or particle compositions are dissolved in water. Regardless of the manner in which acid, base or buffer is added (i.e., whether added to the emulsion prior to or during spray drying or to the particles after spray drying) the amount should be such that the resulting solution containing dissolved polymer particles has a pH at least about 5, preferably at least about 6 and below about 11, preferably a pH below about 8.

It is understood that the pH of the resulting solution will depend on the pH of the water before the polymer particles are added. For instance, in order to produce a preferred pH in the resulting solution in the range of about 5 to about 9, more base should generally be present in the particles if the water is more acidic than if the water is less acidic. It is likewise understood that the preferred amount of base present in the polymer particles may depend on the pH of the water into which the polymer particles are to be dissolved. For example, for many waters of moderate acidity, the polymer particles should contain about 0.1% to about 3.5%, based on total weight, of a preferred base such as sodium bicarbonate. Generally, the polymer particles may contain base in an amount of at least about 0.05% by weight, preferably at least about 0.1% and generally up to about 10.0% preferably up to about 20.0% by weight based on total particle weight. More preferably the amount of base ranges from about 0.05% to about 5.0%, based on total weight of particles. The aforesaid amounts also apply to acids. Similar reasoning is understood concerning the optimum amount of acid; i.e. the presence of more acid will be preferred in the particles when the water is more basic than when the water is less basic in order for the solution of the polymer to have the desired pH. Routine experimentation by one skilled in the art may be used to determine the appropriate amount of acid, base or buffer for a particular water.

Likewise, the amount of buffer will also depend on the pH of the water before the polymer particles are added. The amount of buffer present will tend to affect the ability of the polymer solution to resist changes in pH. For instance, for a preferred buffer system such as $KH_2PO_4/Na_2HPO_4.12 H_2O$, the buffer should be at least about 0.1%, by weight, and preferably at least about 5%, by weight, of the total weight of the particles. Although it would seem preferable to use as much buffer as possible so as to provide the polymer solution with the greatest ability to resist pH changes, it is also preferable for the polymer particles to contain as much polymer as possible. Thus, in practice, the buffer should comprise less than 50%, by weight, of the polymer particles, and preferably less than 30%, by weight, same basis. Therefore, the buffer should be present in the polymer particles at a level of at least about 0.05%, generally from about 0.1% to about 50%, by weight, and preferably about 5% to about 30%, by weight, based on the total particle weight. The exact amount of buffer depends on the pH of the water and how strongly the polymer solution needs to be able to resist changes in pH.

In addition to pH, another factor which tends to influence the rate of dissolution of the polymer particles and the performance of the polymer is the temperature of the polymer solution or the solution into which the polymer particles are dissolved. Therefore, the amount of acid, base, or buffer present in the polymer particles may vary depending on the temperature of the water into which the polymer is to be dissolved. For instance, quaternized Mannich polyacrylamide tends to dissolve more readily at higher temperatures, so that a lower pH, such as about 5, may be desired to dissolve the polymer when the temperature of the water is higher, such as about 35° C., whereas a pH of about 8 may be preferred if the water temperature is very low, such as about 5° C. It is apparent, therefore, from the foregoing that less base, or more acid, might be preferred at high temperatures than at low temperatures, and that the selection of buffer will also depend on the temperature.

The particle size of the acid, base, or buffer is not particularly important, and may be varied to optimize the flow properties of the mixture with the polymer particles. For instance, a preferred range of particle sizes for sodium bicarbonate is from about 10 to about 500 microns, more preferably about 50 to about 300 microns. The means for adding and mixing the substantially dry base to the polymer particles are likewise not critical. Any mechanical mixing means known to those skilled in the art for mixing granular solids is suitable.

It has also been discovered that agglomeration of the polymer particles of the instant invention may improve the flow properties and dissolution times of the polymers. Agglomeration is a known process for increasing particle size and various methods for agglomerating particles are known to those skilled in the art, e.g. "Successfully Use Agglomeration for Size Enlargement," by Wolfgang Pietsch, *Chemical Engineering Progress*, April 1996, pp. 29–45; "Speeding up Continuous Mixing Agglomeration with Fast Agitation and Short Residence Times," by Peter Koenig, *Powder and Bulk Engineering*, February 1996, pp. 67–84. Known agglomeration methods such as natural agglomeration, mechanical agglomeration, tumble or growth agglomeration, pressure agglomeration, binderless agglomeration, agglomeration with binders, etc. may be used to agglomerate the polymer particles of the instant invention. Agglomeration may optionally be followed by drying e.g. fluid bed drying, to remove binder e.g. water. Pressure agglomeration is preferred, and mechanical agglomeration using a water binder, followed by fluid bed drying is most preferred.

The agglomerates formed by agglomerating the polymer particles of the instant invention tend to have improved flow properties and faster dissolution times when compared to the unagglomerated polymer particles. Preferably, the agglomerates are non-dusting. Flow properties may be measured by measuring flow times as described in the Examples. Dissolution rates may be determined by measuring the increase in viscosity of a polymer solution as a function of dissolution time, as described in the Examples. Typically, about 90% of the agglomerates of the instant invention have an agglomerate size of about 120 microns or greater, preferably about 160 microns or greater, more preferably about 200 microns or greater, most preferably about 300 microns or greater. Generally, about 90% of the agglomerates have an agglomerate size of about 1500 microns or less, preferably about 1200 microns or less, more preferably about 1100 microns or less, most preferably about 1000 microns or less. Thus, about 90%, preferably 95%, of the agglomerates have a size in the range of about 120 to about 1500 microns, preferably about 160 microns to about 1200 microns, more preferably about 200 microns to about 1100 microns, most preferably about 300 microns to about 1000 microns Usually, at least about 5% of the agglomerates, preferably at least about 10%, most preferably at least about 15%, are larger than about 900 microns. The agglomerates formed by agglomerating the spray-dried particles of the instant invention may be screened to remove an oversize or undersize fraction. Preferably, agglomerates larger than about 1200 microns and smaller than about 175 microns are removed by e.g. screening. Oversize agglomerates are generally fragmented by e.g. grinding, whereas undersized agglomerates are generally recycled into the agglomerator.

The bulk density values of the agglomerates of the instant invention tend to be lower than the bulk density values of the spray-dried particles from which they are formed. The bulk densities of the agglomerates of the instant invention are generally about 0.35 g/cc or greater, preferably about 0.4 g/cc or greater, more preferably about 0.45 g/cc or greater, most preferably about 0.50 g/cc or greater. The bulk densities of the agglomerates of the instant invention are generally about 1.0 g/cc or less, preferably about 0.95 g/cc or less, more preferably about 0.90 g/cc or less, most preferably about 0.85 g/cc or less. Therefore, the bulk densities of the agglomerates of the instant invention generally range from about 0.35 to about 1.0 g/cc, preferably about 0.4 to about 0.95 g/cc, more preferably about 0.45 to about 0.90 g/cc, most preferably about 0.50 to about 0.85 g/cc.

In order to obtain agglomerates of a preferred size, it is preferred that the polymer particles themselves be of such a size that they are agglomerable. Agglomeration obviously tends to multiply the average particle size, so that it is frequently easier to cause large increases in particle size than it is to cause small increases in particle size. Therefore, to produce agglomerates of a preferred size or size range, it is generally preferred to agglomerate particles that arc much smaller than the desired agglomerate size, rather than particles that are only slightly smaller. Agglomerable particles are generally those that may be conveniently agglomerated to produce agglomerates having a preffered size. It is possible, but less preferred, to agglomerate larger particles to produce agglomerates that are larger than desired, then remove the oversize agglomerates as described above.

The substantially dry polymer particles and agglomerates of the present invention are generally comprised of the polymer that was contained in the dispersion, water-in-oil emulsion, or water-in-oil microemulsion that was spray-dried, as discussed hereinabove. Preferably, the substantially dry polymer particles and agglomerates of the present invention are comprised of polymer having pendant groups selected from the group consisting of amide, tertiary aminomethyl, quaternized tertiary aminomethyl, hydroxyl, glyoxal, sulfonate, sulfonate salt, carboxylic acid, carboxylic acid salt, hydroxamic acid, hydroxamic acid salt, dialkylaminoalkyl(alk)acrylate, dialkylaminoalkyl(alk) acrylate salts, and quaternized dialkylaminoalkyl(alk) acrylate. Polymers and copolymers of acrylamide are preferred.

In a preferred embodiment, substantially dry water-soluble or water-swellable polymer particles and agglomerates are comprised of a polymer having 1 mole % or more of recurring units having pendant groups selected from the group consisting of tertiary aminomethyl, quaternized tertiary aminomethyl, glyoxal, hydroxamic acid, and hydroxamic acid salt, based on total moles of recurring units. In another preferred embodiment, substantially dry water-soluble polymer particles and agglomerates are comprised of a polymer having 1 mole % or more of recurring units having pendant groups selected from the group consisting of carboxylic acid and carboxylic acid salt, based on total moles of recurring units, said polymer having a standard viscosity of about 7.0 cps or greater, and in another preferred embodiment, said polymer is further comprised of recurring units having pendant alkyl ester groups, wherein said alkyl ester groups contain from about 2 to about 12 carbon atoms. In another preferred embodiment, substantially dry water-soluble or water-swellable polymer particles and agglomerates are comprised of acrylamide, (meth) acryloxyethyltrimethylammonium chloride, copolymers thereof, and, optionally, branching agent e.g. methylenebisacrylamide, as described in U.S. patent application Ser. Nos. 08/455,419 and 08/462,922.

In another preferred embodiment, substantially dry water-soluble polymer particles and agglomerates are comprised of a polymer having 10 mole % or more of recurring units having pendant groups selected from the group consisting of carboxylic acid and carboxylic acid salt and wherein said polymer has a standard viscosity of at least about 8.0 cps, or (b) wherein said polymer contains 20 mole % or more of recurring units having pendant groups selected from the group consisting of carboxylic acid and carboxylic acid salt and wherein said polymer has a standard viscosity of at least about 9.0 cps.

In yet another preferred embodiment, substantially dry water-soluble polymer particles and agglomerates are comprised of an ionic, organic, polymer microbead being less than about 750 nanometers in diameter if crosslinked and less than about 60 nanometers in diameter if non-crosslinked and water-insoluble, the ionicity of the microbead being at least about 1%.

The substantially dry polymer particles and agglomerates of the present invention generally exhibit improved stability relative to the dispersion, water-in-oil emulsion, or water-in-oil microemulsion from which they were derived. For instance, Table 7 shows the change in standard viscosity as a function of time at 90° C. for spray dried quaternized Mannich polyacrylamide, compared to a quaternized Mannich polyacrylamide microemulsion from which the spray dried polymer was derived. The standard viscosity of the microemulsion polymer changed substantially as a function of time, whereas the change in standard viscosity for the spray dried polymer was much less. Table 8 shows data obtained in a similar manner, except that the dry polymer and the microemulsion polymer were stored at ambient temperature. Once again, the standard viscosity of the microemulsion polymer changed substantially as a function of time, whereas the change in standard viscosity for the spray dried polymer was not substantial. In both cases, at room temperature and at 90° C., it is quite surprising that the spray dried polymer shows greater stability, as measured by standard viscosity, than the corresponding polymer contained in the microemulsion.

Surprisingly, the standard viscosities of the polymer particles and agglomerates that are the product of the process described herein are not substantially reduced by the spray drying process of the invention. Generally, the standard viscosity values of the polymer particles are not decreased by greater than about 15% of their initial value, preferably not greater than about 10%, more preferably not greater than about 8%, most preferably not greater than about 5%, as a result of the spray drying process, even when the standard viscosity of the polymer in the polymer-containing water-in-oil microemulsions is observed to decrease quickly at elevated temperatures as described hereinabove. It is also surprising that the short residence times result in polymer particles with low volatile levels. Moreover, the residual level of oil in the finely divided polymer particles is typically very low, usually less than 1.0% by weight, based on the total weight of the particles, and preferably less than 0.2% by weight, same basis.

The free flowing, substantially dry, water-soluble polymer particles and agglomerates that are the product of the invention described herein may be used in many applications, such as, for example, solids/liquids separation; flocculants for mining operations to recover ore from slurries; flocculants for water treating to remove suspended impurities etc.; in paper making as a flocculant and to aid paper formation e.g. retention aids; in oil recovery industries e.g enhanced oil recovery, treatment of oily wastewater, etc.; in agriculture e.g. soil stabilization or soil conditioning; in biotechnological applications e.g. treatment of enzyme broths; and in food processing e.g. flocculation of suspended food particles. The polymers of the present invention can conveniently be employed e.g. as flocculants in the form of dilute aqueous solutions. These solutions can be prepared by intermixing, dispersing, and/or dissolving the particles in or with water. Concentrating dispersions of suspended solids is carried out by adding an effective amount of the dilute aqueous solution to the suspension to produce an effluent of desired characteristics. For instance, a preferred method of treating suspended solids comprises (a) dissolving, dispersing, or intermixing substantially dry water-soluble or water-swellable polymer particles or agglomerates in or with water to form a polymer solution, polymer dispersion, or aqueous mixture, (b) intermixing said polymer solution, dispersion or aqueous mixture with suspended solids, and (c) separating resultant concentrated solids from resultant aqueous liquid.

The polymer products of this invention are useful in a wide range of solid-liquid separations. These polymers may be used in the dewatering of biologically treated suspensions, such as sewage or other municipal and industrial sludges, the drainage of cellulosic suspension such as those found in paper production, e.g. paper waste, the production of paper e.g. retention aids, and the settlement of various organic or inorganic suspensions, i.e. refinery waste, food waste, etc. Likewise, enzyme broths and suspended mineral solids may be treated similarly. The dose of polymer effective for a particular application is generally found by routine experimentation in a manner well-known to those skilled in the art. Preferred doses range from about 0.1 parts of polymer per million (ppm) to about 10,000 ppm, based on the weight of the solids suspended in the substrate to be treated.

When the particles are produced in such a way that they are not water-soluble but are instead water-swellable, they may be dispersed in water to form aqueous mixtures comprised of dispersions of water-swellable polymers. Water-swellable polymers may be useful for applications such as thickening paint, in papermaking e.g. as described in U.S. Pat. No. 5,274,055 and U.S. Pat. No. 5,167,766, and as printing ink thickeners.

The following examples are set forth for illustration purposes only and are not to be construed as limits on the present invention.

Test Procedures

Standard viscosity is the viscosity of a 0.096% solution of water-soluble polymer in 1 N sodium chloride at 25° C., at a pH of 8.0 for nonionic and anionic polymers and at a pH of 7.0 for cationic polymers, except where noted. The viscosity was measured by a Brookfield LVT viscometer with a UL adapter at 60 rpm. The polymer solution being measured was made by preparing a 0.20% solution of polymer in deionized water during two hours and then diluting with the appropriate amounts of deionized water and sodium chloride.

Volatiles content (% loss on drying; LOD) was determined using a Sartorius Model MA30 Moisture Analyzer. The dry polymer sample was dried at a specified temperature either to a constant weight or for a specified time. A period of 30 minutes at 105° C. provided a reliable and reproducible indicator of product volatiles content. The results are reported as weight percent volatiles based on the total weight.

Water analysis of the volatiles was performed by Karl Fisher titration. Residual oil levels in the dry products were determined by sample extraction with supercritical carbon dioxide and gas chromatography analysis of the extractant. Residual formaldehyde in the recovered oil was determined by stirring the recovered oil with water for thirty minutes, then analyzing the water extractant by ion chromatography.

The laboratory spray dryer used in the Examples below was obtained commercially. The chamber of the laboratory spray dryer was 760 millimeters (mm) in diameter with a 860 mm verticle side and a 65 degree conical bottom. Nominal gas flow through the dryer was about 180 cubic meters per hour. The emulsion or microemulsion feed was fed at the center of the top of the chamber using a variable speed pump, through a two-fluid nozzle using air for atomization. The outlet gas temperature was controlled by varying the inlet gas temperature and feed rate. To provide an inert atmosphere, the dryer was supplied with nitrogen gas from a cryogenic storage tank. The dried polymer product was discharged through the bottom of the dryer cone to a cyclone where the dry product was removed and collected. Residence time in the dryer was generally about 10–15 seconds.

Some spray-drying Examples were performed with a commercial-scale 8.3 foot diameter closed cycle spray dryer equipped with a direct contact spray condenser.

Spray-dried polymer particle products were agglomerated using a commercial mechanical agglomerator in conjunction with a 10.76 square foot fluid bed dryer. The agglomerator had a vertical shaft and a flexible polymer housing, with a single shaft rotor having 2 or 3 pin or paddle-type mixing elements that rotated at 1500 to 5200 revolutions per minute (rpm). It was equipped with mechanically driven rollers that moved along the flexible polymer housing to prevent accumulation of material along the walls. The spray-dried product and binder e.g. water were fed to the top of the agglomerator; the spray-dried polymer by screw feeder, and the via spray nozzles. The agglomerates formed by agglomerating the spray-dried polymer particles dropped out of the bottom of the agglomerator and directly into a fluid bed-dryer, where the agglomerates were dried to the desired water content. Typical residence time in the agglomerator was about two seconds.

The purpose of the funnel flow test is to identify the funnel at which polymer particles and agglomerates fail to flow, both uncompacted and compacted. The funnel flow test is conducted using 5 funnels, numbered 1–5, respectively, having the following outlet diameters: 14 mm, 12 mm, 8 mm, 5 mm, 3.5 mm. The procedure is followed by starting with funnel 5 (oulet 3.5 mm), blocking the outlet, filling the funnel with the polymer to be tested, and unblocking the outlet to allow the polymer to flow. If all of the polymer passed through the funnel, the polymer was given a score of +5. If the polymer failed to flow from the funnel when the outlet was unblocked, the procedure was repeated with funnel 4, funnel 3, etc. until flow was observed. The funnel number was recorded when flow was not observed. The process was then repeated to determine the flow of compacted polymer, by tapping the funnel about twenty times (or placed on a suitable vibrating plate) to create compaction. For example, a polymer with a score of +5, +5 flowed through the No. 5 funnel on both tests, whereas a polymer with a score of +5, 3 flowed through the No. 5 funnel uncompacted, but would not flow through the No. 3 funnel when compacted.

The bulk density of polymer particles and agglomerates was determined by adding the particles or agglomerates to a suitable preweighed measuring container and "tapping" or slightly agitating the container to cause the particles or agglomerates to settle. The volume of the polymer was then read from the measuring container, the measuring container weighed, and the bulk density calculated in units of grams per cubic centimeter (g/cc).

Dissolving times were determined by adding a 0.2 parts of polymer particles or agglomerates to 99.8 parts of deionized water in a suitable vessel and stirring with a magnetic stir bar. The bulk viscosity of the mixture was measured at regular intervals e.g. five or ten minutes, using a Brookfield LVT viscometer with a UL adapter at 60 rpm, until a maximum bulk viscosity was reached, e.g. until no further increase in bulk viscosity was observed. The time to achieve this maximum bulk viscosity was recorded as the dissolving time and was generally no more than a few hours.

In the following Examples, the quaternized Mannich polyacrylamide microemulsions (Cat.PAM) were prepared as in U.S. Pat. No. 4,956,399, except that Isopar G was used as the oil. The hydrolyzed polyacrylamide emulsions were prepared as described in U.S. Pat. No. 5,286,806, except that Isopar G was used as the oil. Highly crosslinked acrylamide/acrylic acid emulsion and microemulsion copolymer microbeads were prepared as described in U.S. Pat. No. 5,274,055, except that Isopar G was used as the oil. Cationic emulsion copolymers of (meth)acryloxyethyltrimethylammonium chloride and acrylamide, and anionic copolymers of acrylic acid and acrylamide, were prepared by known methods e.g. Vanderhoff, U.S. Pat. No. 3,284,393, and branched cationic polymers were prepared as in U.S. patent application Ser. No. 08/455,419, except that Isopar G was used as the oil in all cases. In all cases, the substitution of Isopar G for the other oil was on a volume basis.

Polymer particle and agglomerate sizes were determined by commercially available light scattering instrumentation and by conventional sieve techniques.

EXAMPLE 1

A quaternized Mannich polyacrylamide microemulsion (Cat.PAM) having a Standard Viscosity of about 2.5 was spray dried in a laboratory spray dryer using a two-fluid nozzle in a nitrogen atmosphere with gas inlet and outlet temperatures of 182° C. and 92° C. respectively. The volatiles were 7.65% and the residence time was 14 seconds. The Standard Viscosity of a solution of the dry product was 2.25 cps, 9.3% less than the standard viscosity of a solution of the microemulsion product. The polymer particles ranged in size from about 19 to about 900 microns. The level of residuals in the dry product were as follows: formaldehyde: 520 ppm; methyl chloride: less than 100 ppm; dimethylamine hydrochloride: 3724 ppm; trimethylamine hydrochloride: 6248 ppm; tetramethylammonium hydrochloride: 5219 ppm.

EXAMPLE 2 (Comparative)

The Cat.PAM of Example 1 was dried on a 12-inch by 18-inch vacuum double drum dryer with less satisfactory results. The steam temperature on the drum was 115° C. and the steam pressure on the drums was 10 psig. The drum was operated at 6 revolutions per minute with a drum clearance of 0.010 inches and with a vacuum of about 65 mm Hg. The feed rate was about 90 pounds of emulsion per hour. The percent volatiles and Standard Viscosity are set forth in Table 1. A comparison of the dry polymer produced herein to that of Example 1 shows that the Standard Viscosity was significantly reduced using the drum dryer.

TABLE 1

| Ex. No. | Emulsion Name | Gas Inlet/Outlet Temperature ° C. | Residence Time, sec. | Volatiles (LOD), % | Polymer Emulsion Standard Viscosity, cps | Dry Product Standard Viscosity, cps. | Change in Standard Viscosity, % |
|---|---|---|---|---|---|---|---|
| 1 | Cat. PAM | 182/92 | 14 | 7.65 | 2.48 | 2.25 | −9.3 |
| 2C | Cat. PAM (drum dried) | N/A | N/A | 9.9 | 2.48 | 1.98 | −20.2 |

C: Comparative Example

EXAMPLES 3–7

A Cat.PAM having a Standard Viscosity of about 2.5 was spray dried using an 8.3 foot diameter commercial spray dryer with a rotary (spinning disk) atomizer. The dryer was operated using air on a once-through basis. The various temperatures and residence time conditions used are described in Table 2; residence time was 30 seconds for all of the runs. Product was collected both at the base of the dryer (chamber) and at the discharge of a cyclone located immediately after the dryer. Table 2 also shows the analytical results of Examples 3–7; in each case, polymer product from each of the two collection points (chamber and cyclone) was analyzed with the results as shown. In each case, the Standard Viscosity of the polymer particles was within 15% of the Standard Viscosity of the corresponding Cat.PAM.

TABLE 2

| Ex. No. | Emulsion Name | Gas Inlet/Outlet Temperature ° C. | Atomizer Speed, rpm | Collection Point | Volatiles (LOD), % | Polymer Emulsion Standard Viscosity, cps | Dry Product Standard Viscosity, cps. | Change in Standard Viscosity, % |
|---|---|---|---|---|---|---|---|---|
| 3 | Cat. PAM | 138/86 | 19,500 | chamber | 8.59 | 2.44 | 2.45 | +0.4 |
|   |   |   |   | cyclone | 9.64 | 2.44 | 2.60 | +6.6 |
| 4 | Cat. PAM | 178/93 | 17,100 | chamber | 8.91 | 2.44 | 2.44 | 0 |
|   |   |   |   | cyclone | 9.71 | 2.44 | 2.59 | +6.2 |
| 5 | Cat. PAM | 181/92 | 15,800 | chamber | 8.40 | 2.44 | 2.40 | −1.6 |
|   |   |   |   | cyclone | 9.42 | 2.44 | 2.58 | +5.7 |
| 6 | Cat. PAM | 173/81 | 15,800 | chamber | 9.14 | 2.44 | 2.40 | −1.6 |
|   |   |   |   | cyclone | 10.93 | 2.44 | 2.58 | +5.7 |
| 7 | Cat. PAM | 171/81 | 13,400 | chamber | 10.34 | 2.44 | 2.38 | −2.5 |
|   |   |   |   | cyclone | 10.85 | 2.44 | 2.49 | +2.1 |

EXAMPLES 8–12

A Cat.PAM having a Standard Viscosity of about 2.5 was spray dried using an 8.3 foot diameter commercial spray dryer with a pressure nozzle atomizer. The dryer was operated as a closed cycle system using nitrogen gas. Product was collected at the base of the dryer or chamber. After recovering the polymer, the outlet gas was passed through a direct contact condenser and the resulting aqueous and Isopar G layers were separated. The cooled gas was then reheated and returned to the inlet of the dryer; a very small fraction was vented. The level of residual formaldehyde in the recovered Isopar G was 0.09 milligrams/kilogram, as measured after the completion of the five runs. The quality of the recovered Isopar G was such that it could be recycled and used directly for further microemulsion or emulsion polymerizations. Table 3 provides the various process conditions; the residence time for all runs was 24 seconds. The properties of the resulting dry polymer particles are also shown in Table 3. One to three samples of the polymer product were collected for each run and analyzed as shown. In each case, the Standard Viscosity of the polymer particles was within 15% of the Standard Viscosity of the initial Cat.PAM used to spray dry.

EXAMPLE 13

A Cat.PAM having a Standard Viscosity of about 2.5 was buffered with urea/lactic acid to pH 4.5, then heat treated by heating to 67–70° C. for 7–9 hours, then allowed to cool to ambient temperature. This heat treatment process is described in U.S. patent application Ser. No. 08/018,858, filed Feb. 12, 1993. The resulting polymer microemulsion was then spray dried in a laboratory spray dryer using a two-fluid nozzle. The various temperatures and residence time conditions used are described in Table 4. As shown in the Table, the Standard Viscosity of the polymer particles was within 15% of the Standard Viscosity of the corresponding heat treated Cat.PAM. The levels of residuals in the dry product were as follows: formaldehyde: 510 ppm; methyl chloride: less than 100 ppm; dimethylamine hydrochloride: 7500 ppm; trimethylamine hydrochloride: 6928 ppm; tetramethylammonium hydrochloride: 4671 ppm.

TABLE 3

| Ex. No. | Emulsion Name | Gas Inlet/Outlet Temperature ° C. | Nozzle Orifice Size, mm | Sample # | Volatiles (LOD), % | Polymer Emulsion Standard Viscosity, cps | Dry Product Standard Viscosity, cps. | Change in Standard Viscosity % |
|---|---|---|---|---|---|---|---|---|
| 8 | Cat. PAM | 177/86 | 1.4 | 1 | 9.70 | 2.49 | 2.36 | −5.2 |
|   |   |   |   | 2 | 9.64 | 2.49 | 2.16 | −13.3 |
| 9 | Cat. PAM | 183/90 | 1.3 | 1 | 11.76 | 2.49 | 2.57 | +3.2 |
|   |   |   |   | 2 | 11.67 | 2.49 | 2.48 | −0.4 |
|   |   |   |   | 3 | 10.28 | 2.49 | 2.46 | −1.2 |
| 10 | Cat. PAM | 184/91 | 1.3 | 1 | 8.12 | 2.49 | 2.20 | −11.7 |
| 11 | Cat. PAM | 145/91 | 0.8 | 1 | 9.15 | 2.49 | 2.21 | −11.2 |
|   |   |   |   | 2 | 9.57 | 2.49 | 2.42 | −2.8 |
| 12 | Cat. PAM | 164/93 | 1.04 | 1 | 6.80 | 2.49 | 2.32 | −6.8 |
|   |   |   |   | 2 | 8.53 | 2.49 | 2.30 | −7.6 |

TABLE 4

| Ex. No. | Emulsion Name | Gas Inlet/Outlet Temperature °C. | Volatiles (LOD), % | Residence Time, sec. | Polymer Emulsion Standard Viscosity, cps | Dry Product Standard Viscosity, cps. | Change in Standard Viscosity, % |
|---|---|---|---|---|---|---|---|
| 13 | Cat. PAM (heat treated) | 200/92 | 5.6 | 14 | 2.51 | 2.17 | −13.5 |

EXAMPLE 14

Cat.PAM polymer particles were obtained by the spray drying process of Example 1. To 97.5 parts of these granules was added 2.5 parts of sodium carbonate in a suitable vessel. The vessel was mechanically shaken for 30 minutes to form a composition containing substantially dry granules of quaternized Mannich polyacrylamide and sodium carbonate.

EXAMPLE 15

Particles of Cat.PAM were obtained by the spray drying process of Example 13 and then sodium carbonate was added according to the process of Example 14. Solutions of the particles were prepared by dissolving 0.2 parts of the particles in 100 parts water. The dry particles took approximately 1 hour to dissolve. A sample of the heat treated polymer microemulsion described in Example 13 was also dissolved in water to produce a similar polymer concentration. Both polymers were allowed to stir in water for two hours, then were tested for their ability to flocculate suspended solids using a 2.0% solids digested sewage sludge. approximately 200 parts of the sludge was mixed at about 1000 rpm with various amounts of the polymer solutions, ranging from 10 parts to 50 parts, for about 5 seconds. Thereafter, the drainage rates of the flocculated solids were measured at 10, 20 and 30 seconds. The polymer products both performed equally well in the dose range of 25 to 30 pounds of polymer per ton of sludge.

EXAMPLE 16

Particles of Cat.PAM were prepared according to Example 14, except that sodium bicarbonate was used in place of sodium carbonate. The Standard Viscosity of these particles was determined, without adjustment of the pH, to be 2.45 cps. In comparison, the Standard Viscosity (measured without pH adjustment) of particles of Cat.PAM prepared by the procedure of Example 1, which did not contain a base, was measured as 1.3 centipoise. Standard

EXAMPLE 17C

A polyacrylamide microemulsion was prepared as follows: To 143.75 parts of Isopar G, 26.28 parts Atlas G-1086 and 6.57 parts Arlacel 83, were slowly added 172.93 parts of a pH 3.0 aqueous solution containing acrylamide (148.2 parts of 53.3% solution), sodium bromate (1.16 parts of 1% solution), 0.68 parts isopropanol, and ethylenediaminetetraaceteic acid (0.40 parts of 40% solution) with stirring. The resulting monomer microemulsion was sparged for 40 minutes with nitrogen. $SO_2$ gas was then bubbled into the resultant microemulsion and the polymerization temperature was kept below 65° C. The resulting product was a clear stable microemulsion having a standard viscosity of 3.07 centipoise.

EXAMPLE 18

The procedure of Example 17C was followed except that Isopar G recovered by following the process of Examples 8–12 was used in place of the fresh Isopar G. The resulting product was a clear stable microemulsion having a standard viscosity of 3.03 centipoise, virtually the same standard viscosity as was obtained using fresh Isopar G (Example 17C).

EXAMPLES 19–23

A 20% hydrolyzed polyacrylamide emulsion having a polymer solids of 23.8% and a Standard Viscosity of 8.63 centipoise was prepared as described in U.S. Pat. No. 5,286,806, except that Isopar G was used as the oil, then spray dried in a laboratory spray dryer using nitrogen. The inlet temperature, outlet temperature and feed rate were varied, and the LOD, Standard Viscosity (SV), and drying loss of the polymer particle product were measured as shown in Table 5. Smaller drying losses were observed at outlet temperatures of less than 100° C.

TABLE 5

| No. | Inlet Temp., ° C. | Outlet Temp., ° C. | Feed Rate, ml/min. | LOD, % | Product SV, cp | Drying Loss, % |
|---|---|---|---|---|---|---|
| 19 | 162 | 82 | 96 | 10.2 | 8.43 | 2.3 |
| 20 | 161 | 84 | 64 | 7.8 | 8.31 | 3.7 |
| 21 | 193 | 96 | 52 | 5.6 | 8.21 | 4.9 |
| 22C | 227 | 115 | 44 | 3.6 | 8.11 | 6.0 |
| 23C | 253 | 132 | 36 | 2.2 | 7.48 | 13.3 |

Viscosity is known in the art to directly correlate with polymer performance, e.g., flocculation.

C: Comparative Example

EXAMPLES 24–36

A series of 13 water-soluble or water-swellable vinyl-addition polymer containing water-in-oil emulsions and water-in-oil microemulsions were prepared according to the methods referenced below (except that Isopar G was used as the oil), then spray dried in a laboratory spray dryer using nitrogen, and the results obtained in Table 6 were obtained.

monomers, of methylenebisacrylamide were added to the AMD/AETAC polymers of Examples 32 and 34 to create branching, see e.g. U.S. patent application Ser. No. 08/455,419. Mannich and quaternized Mannich microemulsions were prepared by the methods of U.S. Pat. No. 4,956,399 (Examples 35 and 36). In each case, substantially dry, free flowing mixtures of polymer particles having drying losses of about 15% or less were obtained

TABLE 6

| Ex. No. | Type | Solids | Standard Viscosity (cP) | Feed Rate, ml/min | Inlet Temp., ° C. | Outlet Temp., ° C. | Dry Product LOD, % | Dry Product SV, cP | Drying Loss, % |
|---|---|---|---|---|---|---|---|---|---|
| 24 | 10% hydrolyzed PAM emulsion | 24.5 | 7.51 | 60 | 164 | 85 | 5.6 | 7.34 | 2.2 |
| 25 | 40% hydrolyzed PAM emulsion | 22.2 | 10.63 | 52 | 165 | 84 | 6.5 | 10.39 | 2.3 |
| 26 | 70/30 AMD/AA emulsion | 34.9 | 7.94 | 80 | 165 | 86 | 9.0 | 8.22 | 0.6 |
| 27 | 20/80 AMD/AA emulsion | 34.7 | 9.30 | 96 | 162 | 87 | 6.0 | 8.82 | 5.2 |
| 28 | 40% HX emulsion | 10.6 | 12.6 | 45 | 174 | 88 | 6.1 | 11.4 | 9.5 |
| 29 | 40/60 AMD/AA microbead microemulsion | 28.0 | 1.34 | 40 | 189 | 92 | 5.0 | 1.40 | 4.5 |
| 30 | Polyacrylate ester emulsion | 19.3 | 7.9 | 60 | 166 | 85 | 6.7 | 7.43 | 5.9 |
| 31 | 90/10 AMD/AETAC emulsion | 37.1 | 4.07 | 80 | 159 | 85 | 5.1 | 3.81 | 6.4 |
| 32 | 60/40 AMD/AETAC branched emulsion | 37.8 | 1.77 | 95 | 171 | 88 | 4.9 | 1.77 | 0 |
| 33 | 45/55 AMD/AETAC emulsion | 47.0 | 3.60 | 160 | 169 | 81 | 10.4 | 3.65 | 1.4 |
| 34 | 45/55 AMD/AETAC branched emulsion | 45.3 | 3.39 | 96 | 161 | 88 | 5.7 | 3.39 | 0 |
| 35 | Mannich microemulsion | 23.6 | 3.42 | 88 | 152 | 82 | 10.8 | 3.39 | 0.9 |
| 36 | Quaternized Mannich microemulsion | 29.8 | 2.6 | 160 | 161 | 84 | 6.8 | 2.46 | 5.4 |

Hydrolyzed PAM emulsions were obtained by hydrolyzing polyacrylamide (PAM) emulsions as described in U.S. Pat. No. 5,286,806 (Example 24-25). Acrylamide (AMD) and acrylic acid (AA) were emulsion copolymerized to yield AMD/AA emulsions by known methods e.g. Vanderhoff, U.S. Pat. No. 3,284,393 (Examples 26-27). A hydroxamated acrylamide polymer with a degree of hydroxamation of about 40% (40% HX emulsion Example 28) was prepared by the methods of U.S. Pat. No. 4,767,540. The acrylamide/acrylic acid microbead microemulsion of Example 29 was prepared by the methods of U.S. Pat. No. 5,274,055. The water-soluble polyacrylate ester emulsion was prepared by the methods of U.S. patent application Ser. No. 08/626,297 (Example 30). Acrylamide and acryloxyethyltrimethylammonium chloride (AETAC) were emulsion copolymerized to yield AMD/AETAC emulsions by known methods e.g. Vanderhoff, U.S. Pat. No. 3,284,393 (Examples 31–34); small amounts e.g. about 4 molar parts per million, based on

EXAMPLE 37–39

A 20% hydrolyzed polyacrylamide emulsion made with Isopar G was spray-dried on a commercial scale 8.3 foot diameter spray dryer using a direct contact spray condenser. Spray-dry process-generated water and oil were collected and acidified, the layers separated, and the upper Isopar G layer recovered. Side-by-side laboratory-scale acrylamide polymerizations were then performed using the recovered Isopar G and virgin Isopar G. The Standard Viscosity of the polyacrylamide made using the recovered oil was 6.58 cps, virtually the same as the Standard Viscosity of the polyacrylamide made using the virgin oil, 6.67 cps. Subsequently, an acrylamide polymerization was carried out on a 200-gallon scale using the same recovered Isopar G and the same recipe as the laboratory scale batch. The resultant polyacrylamide had a Standard Viscosity of 6.55 cP, essentially the same as the laboratory batch.

EXAMPLES 40-41

A quaternized Mannich polyacrylamide microemulsion having a Standard Viscosity of about 2.1 was spray dried as in Example 1. Both the microemulsion and the polymer particles were placed into an oven at 90° C., and the Standard Viscosities determined at various times, as shown in Table 7. The decrease in the Standard Viscosity of the microemulsion sample was much greater than the modest decrease observed for the spray-dried polymer, in spite of the relatively severe conditions.

TABLE 7

| Time (minutes) | Example 40 Standard Viscosity of Spray-Dried Polymer | Example 41C (Comparative) Standard Viscosity of Microemulsion Polymer |
|---|---|---|
| 0 | 1.86 | 2.1 |
| 15 | 1.66 | 1.25 |
| 30 | 1.52 | 1.15 |
| 60 | 1.47 | 1.10 |

EXAMPLES 42-43

A quaternized Mannich polyacrylamide microemulsion having a Standard Viscosity of about 2.5 was spray dried as in Example 1. Both the microemulsion and the polymer particles were stored at room temperature, and the Standard Viscosities determined at various times, as shown in Table 8. The Standard Viscosity of the spray-dried polymer was essentially unaffected by the passage of time, whereas the Standard Viscosity of the microemulsion polymer decreased noticeably.

TABLE 8

| Time (minutes) | Example 42 Standard Viscosity of Spray-Dried Polymer | Example 43C (Comparative) Standard Viscosity of Microemulsion Polymer |
|---|---|---|
| 5 | 2.25 | |
| 14 | 2.44 | |
| 19 | | 2.48 |
| 24 | 2.36 | |

TABLE 8-continued

| Time (minutes) | Example 42 Standard Viscosity of Spray-Dried Polymer | Example 43C (Comparative) Standard Viscosity of Microemulsion Polymer |
|---|---|---|
| 45 | | 2.11 |
| 46 | 2.44 | |
| 58 | | 2.09 |
| 63 | 2.36 | |
| 75 | | 1.90 |
| 98 | 2.38 | |
| 103 | | 1.84 |
| 215 | 2.37 | |
| 257 | | 1.70 |

EXAMPLES 44–49

An 20% anionic hydrolyzed PAM emulsion was obtained by hydrolyzing a polyacrylamide (PAM) emulsion as described in U.S. Pat. No. 5,286,806. A 55% cationic emulsion was obtained by copolymerizing acrylamide and acryloxyethyltrimethylammonium chloride (AETAC) by known methods e.g. Vanderhoff, U.S. Pat. No. 3,284,393. A Cat.PAM was was obtained as in U.S. Pat. No. 4,956,399. In each case, Isopar G was used as the oil. Part of each sample was precipitated in hexane/acetone, then dried under vacuum to produce a polymer powder. Part of each sample was also spray-dried, and part of each spray-dried sample was agglomerated. Bulk density, flow properties (funnel flow test), dissolving time and particle size were determined and are shown in Table 9. Particle size was determined by light scattering for the precipitated and spray-dried polymers, and by sieve screening for the agglomerates.

TABLE 9

| Ex. No. | Polymer | Bulk Density, g/cc | Funnel Flow | Dissolving Time, min. | Particle Size Distribution |
|---|---|---|---|---|---|
| 44C | 20% Anionic Precipitated | 0.26 | 1,1 | 90 | 90% < 109 microns<br>50% < 42 microns<br>10% < 8 microns |
| 45 | 20% Anionic Spray-dried | 0.79 | 1,1 | 85 | 90% < 148 microns<br>50% < 65 microns<br>10% < 27 microns |
| 46 | 20% Anionic Spray-dried and Agglomerated | 0.53 | 4,3 | 20–25 | 90% < 850 microns<br>50% < 350 microns<br>10% < 170 microns |
| 47C | 55% Cationic Precipitated | 0.30 | 1,1 | 80 | 90% < 18 microns<br>50% < 11 microns<br>10% < 5 microns |
| 48 | 55% Cationic Spray-dried | 0.86 | 1,1 | 60–65 | 90% < 156 microns<br>50% < 68 microns<br>10% < 22 microns |
| 49 | 55% Cationic Spray-dried and Agglomerated | 0.52 | 4,3 | 25–30 | 90% < 1500 microns<br>50% < 600 microns<br>10% < 260 microns |
| 50C | Cat. PAM Precipitated | 0.164 | 1,1 | 80 | 90% < 58 microns<br>50% < 27 microns<br>10% < 17 microns |
| 51 | Cat. PAM Spray-dried | 0.86 | 1,1 | 60–65 | 90% < 152 microns<br>50% < 72 microns |

TABLE 9-continued

| Ex. No. | Polymer | Bulk Density, g/cc | Funnel Flow | Dissolving Time, min. | Particle Size Distribution |
|---|---|---|---|---|---|
| 52 | Cat. PAM Spray-dried and Agglomerated | 0.52 | 4,3 | 25–30 | 10% < 20 microns<br>90% < 1600 microns<br>50% < 560 microns<br>10% < 280 microns |

C: Comparative Example

EXAMPLES 53–55

The agglomerates of Examples 46, 49 and 52 were screened to remove agglomerates larger than about 1190 microns and smaller than about 177 microns. The resultant screened agglomerates had improved flow properties and dissolving times relative to the agglomerates of Examples 46, 49 and 52 as shown in Table 10.

TABLE 10

| Example No. | Screened Agglomerate | Bulk Density, g/cc | Funnel Flow | Dissolving Time, min. |
|---|---|---|---|---|
| 53 | 20% Anionic | 0.5 | 5,4 | 20 |
| 54 | 55% Cationic | 0.51 | 5,4 | 20–25 |
| 55 | Cat. PAM | 0.51 | 5,4 | <15 |

EXAMPLES 56–63

Anionic hydrolyzed PAM emulsions were obtained by hydrolyzing polyacrylamide (PAM) emulsions as described in U.S. Pat. No. 5,286,806, an 80% anionic emulsion was obtained by copolymerizing acrylamide and acrylic acid (AMD/AA) by known methods e.g. Vanderhoff, U.S. Pat. No. 3,284,393, and a Mannich microemulsion was obtained as described in U.S. Pat. No. 4,956,399, except that Isopar G was used as the oil in all cases. Each emulsion and microemulsion was spray-dried according to the conditions shown in Table 11. Smaller drying losses and faster dissolving times were observed when spray-drying was conducted at lower outlet temperatures.

TABLE 11

| Example No. | Polymer | Inlet/Outlet Temperature, ° C. | Drying Loss, % |
|---|---|---|---|
| 56 | 20% Hydrolyzed Anionic PAM emulsion | 162/82 | 4.6 |
| 57 | 20% Hydrolyzed Anionic PAM emulsion | 253/132 | 15.4 |
| 58 | 40% Hydrolyzed Anionic PAM emulsion | 162/84 | 4.0 |
| 59 | 40% Hydrolyzed Anionic PAM emulsion | 265/127 | 18.8 |
| 60 | 20/80 AMD/AA emulsion | 163/86 | 4.8 |
| 61 | 20/80 AMD/AA emulsion | 225/120 | 14.5 |
| 62 | Mannich microemulsion | 155/83 | 6.8 |
| 63 | Mannich microemulsion | 265/130 | 62.5 |

EXAMPLES 64-65

A blend of a Cat.PAM and a cationic copolymer is prepared as in U.S. patent application Ser. No. 08/157,764, and a cationic polymer dispersion is prepared according to the procedures of U.S. Pat. No. 4,506,062 (without distillation), except that Isopar G is used as the oil. The blend and the dipersion are spray-dried in a laboratory spray-dryer as in Examples 24–36. Substantially dry polymer particles are obtained, with drying losses of about 15% or less. Greater than 90% of the spray-dried blend particles contain both the Cat.PAM and the cationic copolymer.

We claim:

1. Substantially dry polymer agglomerates comprised of porous polymer particles having at least one opening in their walls, wherein said polymer agglomerates are comprised of a water-soluble or water-swellable vinyl-addition polymer having pendant groups selected from the group consisting of amide, tertiary amine, tertiary amine salt, quaternized tertiary amine, hydroxyl, glyoxal, sulfonate, sulfonate salt, carboxylic acid, carboxylic acid salt, hydroxamic acid, and hydroxamic acid salt, and wherein said polymer agglomerates range in size from about 120 microns to about 1200 microns.

2. Polymer agglomerates as claimed in claim 1, wherein said polymer is a post-reacted polymer having 1 mole % or more of recurring units having pendant groups selected from the group consisting of tertiary aminomethyl, quaternized tertiary aminomethyl, and glyoxal, based on total moles of recurring units.

3. Polymer agglomerates as claimed in claim 1, wherein said polymer is a water-soluble polymer having 1 mole % or more of recurring units having pendant groups selected from the group consisting of carboxylic acid and carboxylic acid salt and having a standard viscosity of at least about 7.0 cps.

4. Polymer agglomerates as claimed in claim 3, wherein said polymer is a copolymer of acrylamide and acrylic acid.

5. Polymer agglomerates as claimed in claim 4, wherein said polymer is a hydrolyzed polyacrylamide having a degree of hydrolysis of 5 mole % or more.

6. Polymer agglomerates as claimed in claim 1, wherein said polymer is water-soluble and wherein said pendant groups are selected from the group consisting of hydroxamic acid and hydroxamic acid salt.

7. Polymer agglomerates as claimed in claim 1, wherein said polymer is comprised of recurring units of quaternized dialkylaminoalkyl(alk)acrylate or diallyldialkylammonium halide.

8. Polymer agglomerates as claimed in claim 7, wherein said polymer is water-soluble and branched.

9. Polymer agglomerates as claimed in claim 7, wherein said polymer is water-soluble and has a molecular weight greater than about 20,000,000.

10. Polymer agglomerates as claimed in claim 1, wherein said polymer is an ionic, organic, polymer microbead being less than about 750 nanometers in diameter if crosslinked and less than about 60 nanometers in diameter if non-crosslinked and water-insoluble.

11. Polymer agglomerates as claimed in claim 1, wherein said polymer particles are spray-dried from a dispersion, water-in-oil emulsion or water-in-oil microemulsion and wherein said polymer agglomerates exhibit improved stability relative to the dispersion, water-in-oil emulsion or water-in-oil microemulsion from which said polymer particles were derived.

12. Polymer agglomerates as claimed in claim 1, wherein said agglomerates range in size from about 200 microns to about 1000 microns.

13. A method of treating suspended solids, comprising (a) intermixing the polymer agglomerates of claim 1 with water to form an aqueous admixture, (b) intermixing said aqueous admixture with suspended solids, and (c) separating resultant concentrated solids from resultant aqueous liquid.

14. A method as claimed in claim 13, wherein said polymer is a post-reacted polymer having 1 mole % or more of recurring units having pendant groups selected from the group consisting of tertiary aminomethyl, quaternized tertiary aminomethyl, and glyoxal, based on total moles of recurring units.

15. A method as claimed in claim 13, wherein said polymer is a water-soluble polymer having 1 mole % or more of recurring units having pendant groups selected from the group consisting of carboxylic acid and carboxylic acid salt and having a standard viscosity of at least about 7.0 cps.

16. A method as claimed in claim 15, wherein said polymer is a copolymer of acrylamide and acrylic acid.

17. A method as claimed in claim 15, wherein said polymer is a hydrolyzed polyacrylamide having a degree of hydrolysis of 5 mole % or more.

18. A method as claimed in claim 13, wherein said polymer is water-soluble and wherein said pendant groups are selected from the group consisting of hydroxamic acid and hydroxamic acid salt.

19. A method as claimed in claim 13, wherein said polymer is comprised of recurring units of quaternized dialkylaminoalkyl(alk)acrylate or diallyldialkylammonium halide.

20. A method as claimed in claim 19, wherein said polymer is water-soluble and branched.

21. A method as claimed in claim 19, wherein said polymer is water-soluble and has a molecular weight greater than about 20,000,000.

22. A method as claimed in claim 13, wherein said polymer is an ionic, organic, polymer microbead being less than about 750 nanometers in diameter if crosslinked and less than about 60 nanometers in diameter if non-crosslinked and water-insoluble.

23. A method as claimed in claim 13, wherein said polymer particles are spray-dried from a dispersion, water-in-oil emulsion or water-in-oil microemulsion and wherein said polymer agglomerates exhibit improved stability relative to the dispersion, water-in-oil emulsion or water-in-oil microemulsion from which said polymer particles were derived.

24. A method as claimed in claim 13, wherein said agglomerates range in size from about 200 microns to about 1000 microns.

* * * * *